US012605630B2

(12) United States Patent
Cui et al.

(10) Patent No.: US 12,605,630 B2
(45) Date of Patent: Apr. 21, 2026

(54) VIRTUAL ACCESSORY USING METHOD, RELATED APPARATUS, DEVICE, AND STORAGE MEDIUM

(71) Applicant: TENCENT TECHNOLOGY (SHENZHEN) COMPANY LIMITED, Shenzhen (CN)

(72) Inventors: Weijian Cui, Shenzhen (CN); Meng Qiu, Shenzhen (CN); Cong Tian, Shenzhen (CN); Jingjing He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 288 days.

(21) Appl. No.: 18/307,113

(22) Filed: Apr. 26, 2023

(65) Prior Publication Data

US 2023/0264103 A1 Aug. 24, 2023

Related U.S. Application Data

(63) Continuation of application No. PCT/CN2022/108430, filed on Jul. 28, 2022.

(30) Foreign Application Priority Data

Aug. 18, 2021 (CN) .......................... 202110950639.6

(51) Int. Cl.
    *A63F 13/537* (2014.01)
    *A63F 13/2145* (2014.01)
    (Continued)
(52) U.S. Cl.
    CPC ........ *A63F 13/537* (2014.09); *A63F 13/2145* (2014.09); *A63F 13/22* (2014.09);
    (Continued)

(58) Field of Classification Search
    CPC .... A63F 13/537; A63F 13/2145; A63F 13/22; A63F 13/5255; A63F 13/837;
    (Continued)

(56) References Cited

U.S. PATENT DOCUMENTS 11,517,819 B2 * 12/2022 Qiu ......................... G06T 19/00
12,023,583 B2 * 7/2024 Qiu ..................... G06F 3/04815
        (Continued)

FOREIGN PATENT DOCUMENTS

CN       106730810 A    5/2017
CN       108459793 A    8/2018
        (Continued)

OTHER PUBLICATIONS

How to Enable and Fix the Quick Scope Switch Button in PUBG Mobile 0.9.0 | DerekG Tutorial. Derek G. YouTube.com. Online. Oct. 27, 2018. Accessed via the Internet. Accessed Apr. 4, 2025. <URL: https://www.youtube.com/watch?v=VH2KI9NPuGs> (Year: 2018).*
        (Continued)

*Primary Examiner* — Carl V Larsen
(74) *Attorney, Agent, or Firm* — Anova Law Group, PLLC

(57) ABSTRACT

A virtual accessory using method includes: displaying, on a target game interface, a first shooting prop and an accessory switching control for the first shooting prop, the first shooting prop being a shooting prop held by a virtual operation object; obtaining a first touch operation on the accessory switching control; displaying an accessory switching region when the first touch operation satisfies a first switching condition, the accessory switching region including at least three accessory slots, and an accessory slot being used for displaying a virtual accessory; and controlling, in response to detecting a selection operation on a first accessory slot,
        (Continued)

E1 the first shooting prop to use a first virtual accessory, the first accessory slot being one of the at least three accessory slots, and the first accessory slot being used for displaying the first virtual accessory.

20 Claims, 22 Drawing Sheets

(51) Int. Cl.

| | | |
|---|---|---|
| *A63F 13/22* | (2014.01) | |
| *A63F 13/5255* | (2014.01) | |
| *A63F 13/837* | (2014.01) | |
| *A63F 13/92* | (2014.01) | |

(52) U.S. Cl.
  CPC ........ *A63F 13/5255* (2014.09); *A63F 13/837* (2014.09); *A63F 13/92* (2014.09); *A63F 2300/1075* (2013.01); *A63F 2300/8076* (2013.01)

(58) Field of Classification Search
  CPC .............. A63F 13/92; A63F 2300/1075; A63F 2300/8076; A63F 13/426; A63F 13/44; A63F 13/55
  See application file for complete search history.

(56) References Cited

U.S. PATENT DOCUMENTS

| | | | | |
|---|---|---|---|---|
| 2019/0366213 | A1* | 12/2019 | Zhou | A63F 13/533 |
| 2020/0139246 | A1* | 5/2020 | Kinney | A63F 13/35 |
| 2020/0306633 | A1* | 10/2020 | Guo | A63F 13/52 |
| 2020/0406142 | A1* | 12/2020 | Qiu | A63F 13/5372 |
| 2022/0080313 | A1* | 3/2022 | Wu | G06F 3/04817 |
| 2023/0076343 | A1* | 3/2023 | Sui | A63F 13/44 |
| 2024/0078776 | A1 | 3/2024 | Nozaki et al. | |
| 2024/0123331 | A1* | 4/2024 | Fan | A63F 13/22 |
| 2025/0018296 | A1* | 1/2025 | Zhang | G06F 3/0482 |

FOREIGN PATENT DOCUMENTS

| | | |
|---|---|---|
| CN | 109045695 A | 12/2018 |
| CN | 111921190 A | 11/2020 |
| CN | 112057857 A | 12/2020 |
| CN | 113633985 A | 11/2021 |
| JP | 2013154118 A | 8/2013 |
| JP | 2019200627 A | 11/2019 |
| JP | 2021514701 A | 6/2021 |

OTHER PUBLICATIONS

Playing Doom Eternal with a Controller (Like a Stud.) Steamcommunity.com. Online. Apr. 26, 2021. Accessed via the Internet. Accessed Apr. 4, 2025. <URL: https://steamcommunity.com/sharedfiles/filedetails/?id=2464347025> (Year: 2021).*
Black Ops 4: How to use Upgraded Attachments & OP-Mods. Youtube.com. Online. Aug. 5, 2018. Accessed via the Internet. Accessed Aug. 1, 2025. <URL: https://www.youtube.com/watch?v=4VKJIIR7xlc> (Year: 2018).*
The State Intellectual Property Office of the People's Republic of China (SIPO) Office Action 2 for 202110950639.6 Dec. 26, 2023 8 Pages (including translation).
The Japan Patent Office (JPO) Notice of Reasons for Refusal for Application No. 2023-571428 Oct. 15, 2024 19 Pages (including translation).
"PUBG Scope Change Function (Quick Scope Change)" cannot be used. "Causes and solutions for when it doesn't display," Memo for those aiming to become information scientists, Oct. 26, 2018 (Oct. 26, 2018), https://did2memo.net/2018/10/26/pubg-mobile-quick-scope-switch/.
The World Intellectual Property Organization (WIPO) International Search Report for PCT/CN2022/108430 Oct. 26, 2022 12 Pages (including translation).
Hesper,"How can the Peace Elite quickly switch lenses? Special Forces, you need to know this, Pea Pod, [online] [Sep. 22, 2022],", "URL: <https://www.wandoujia.com/apps/7701857/1842823463243532376.html", May 28, 2019 (May 28, 2019).
Focusing on internet consulting, "How can Peace Elite Quickly Switch to Double Mirror Baidu Experience, [online] [Sep. 22, 2022],", "URL: <https://www.jingyan.baidu.com/article/574c521948fe6f6c8c9dc151.html", May 29, 2019 (May 29, 2019).
Korean Intellectual Property Office (KIPO) Office Action 1 for Application No. 20237034377 Jun. 9, 2025 16 Pages (including translation).
Invention 3: sniper ghost warrior contract 2, Jul. 29, 2021 (Jul. 29, 2021), https://www.youtube.com/watch?v=tgBpaGHMenY&list=PLb9UGrFgV6sBeM2TGcB6gxgjCZ-sGVZH5&index=2).

* cited by examiner

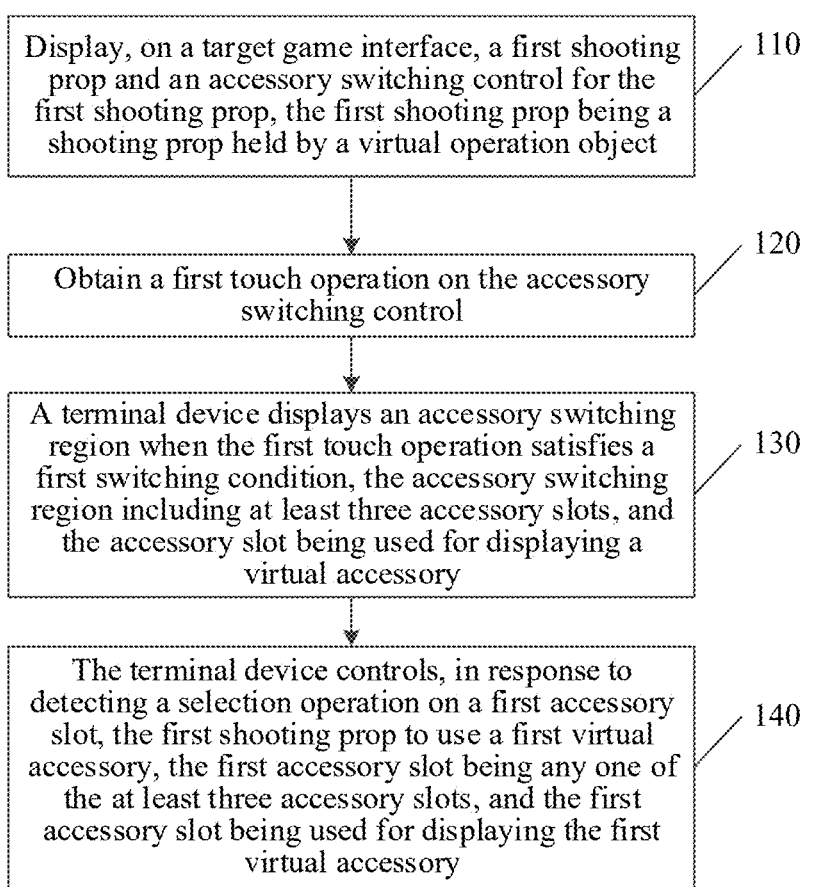

Display, on a target game interface, a first shooting prop and an accessory switching control for the first shooting prop, the first shooting prop being a shooting prop held by a virtual operation object — 110

Obtain a first touch operation on the accessory switching control — 120

A terminal device displays an accessory switching region when the first touch operation satisfies a first switching condition, the accessory switching region including at least three accessory slots, and the accessory slot being used for displaying a virtual accessory — 130

The terminal device controls, in response to detecting a selection operation on a first accessory slot, the first shooting prop to use a first virtual accessory, the first accessory slot being any one of the at least three accessory slots, and the first accessory slot being used for displaying the first virtual accessory — 140

FIG. 3

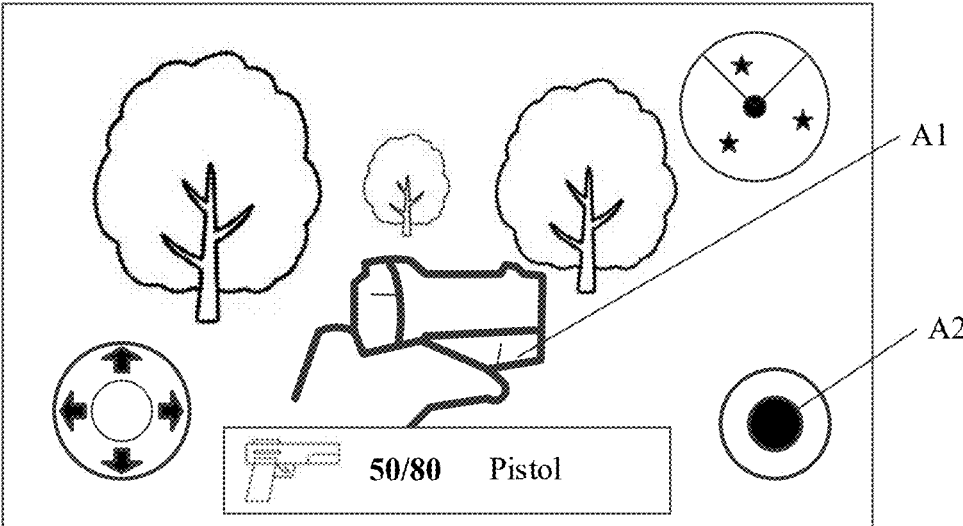

A1

A2

50/80    Pistol

0th second (B)

(0.3)th second

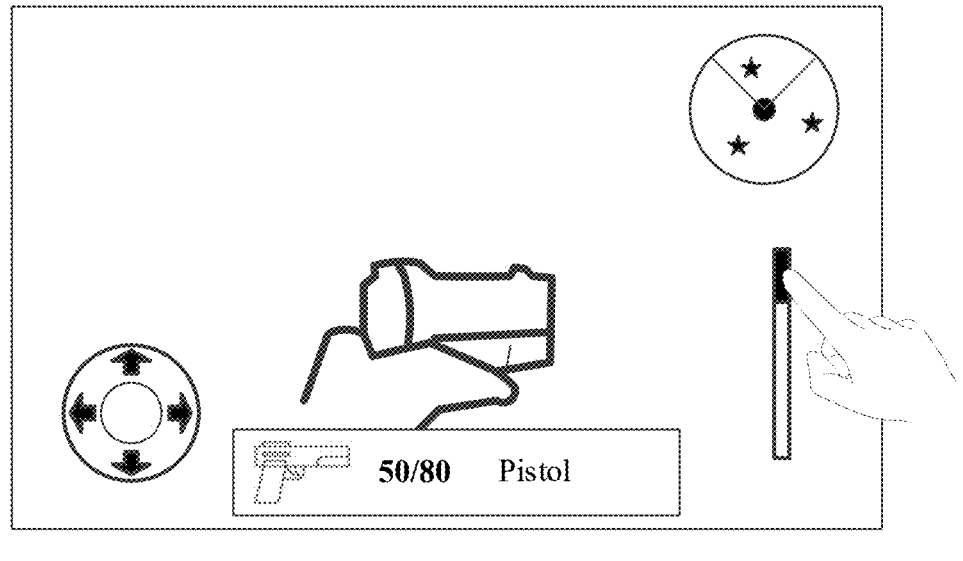
(A)
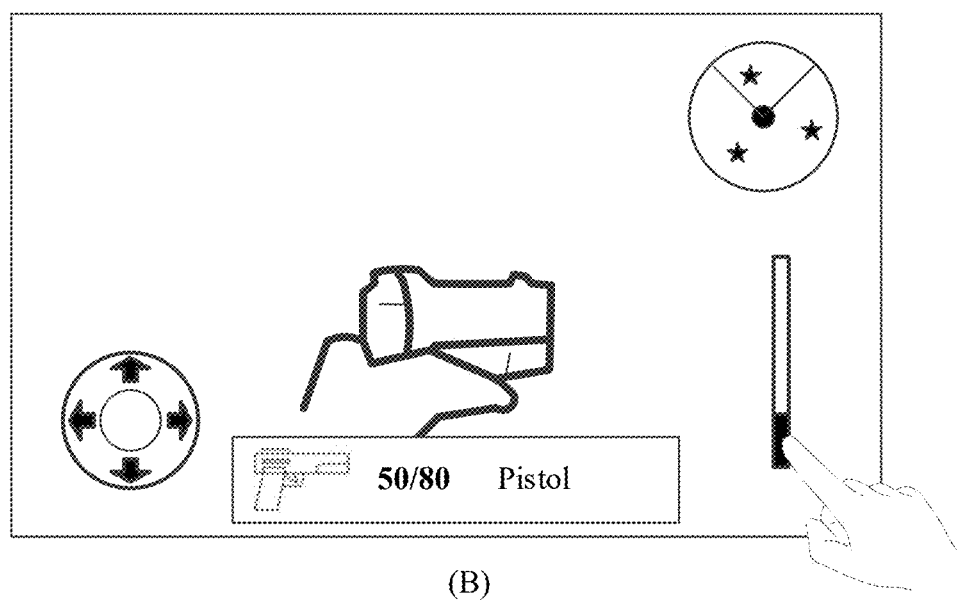
(B)
FIG. 8

E1

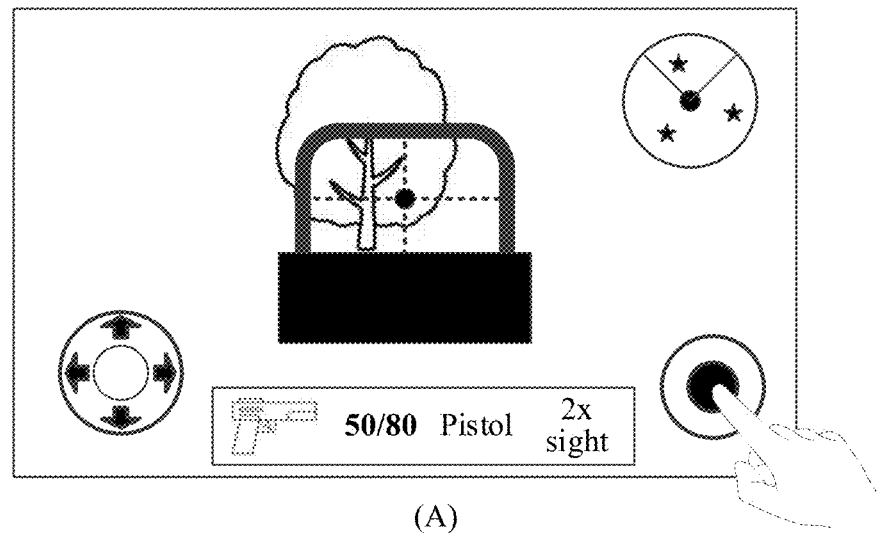
(A)
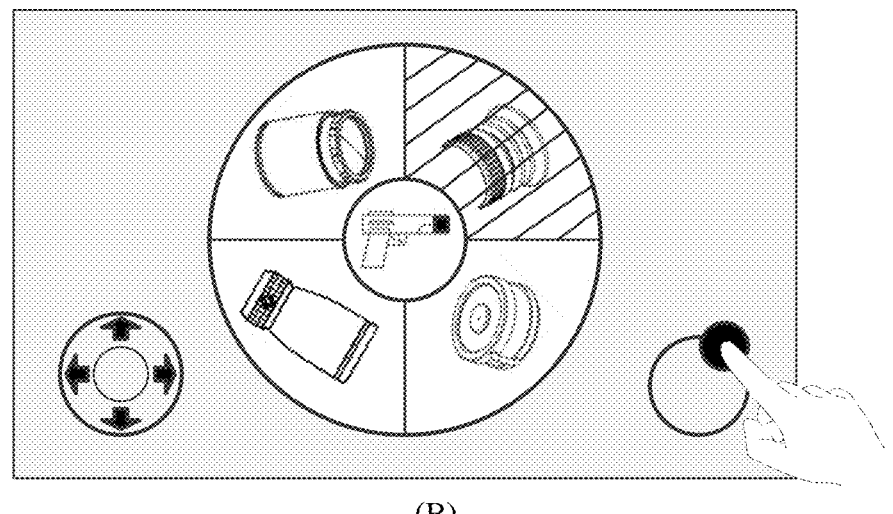
(B)
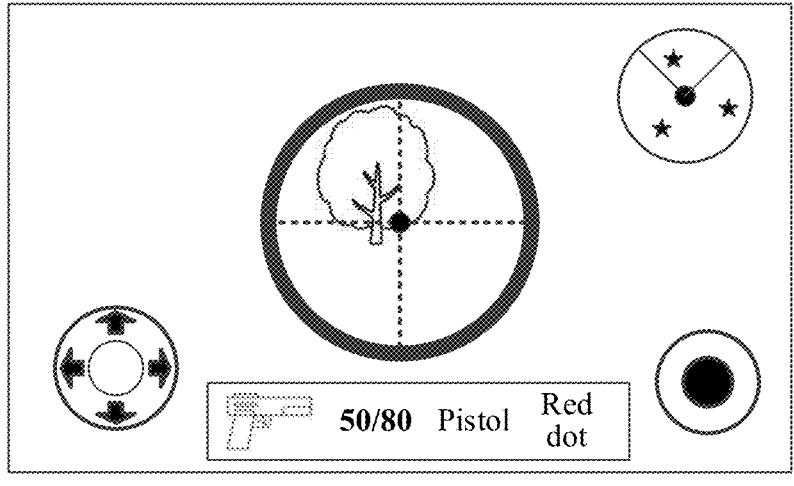
(C)
FIG. 21

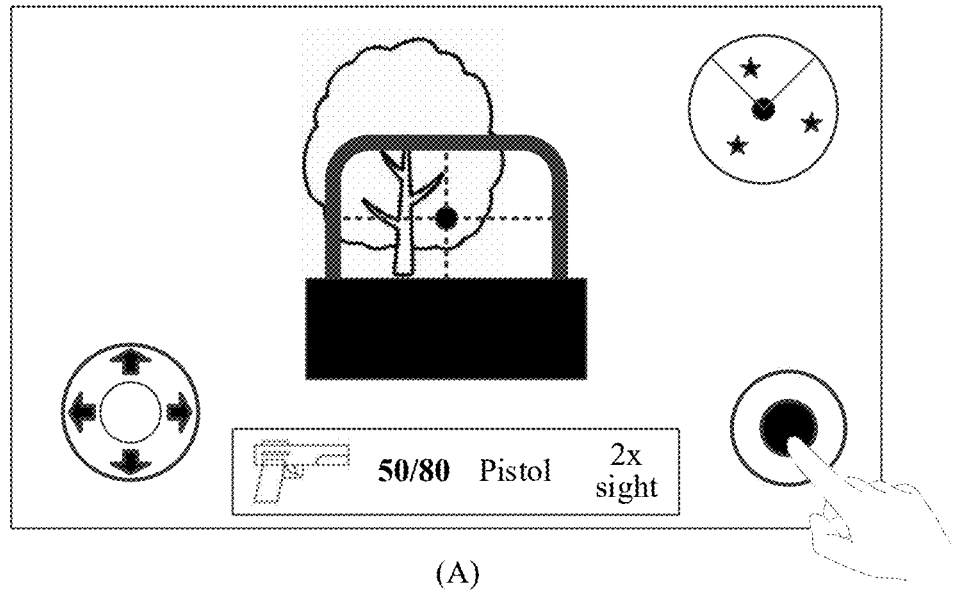
(A)
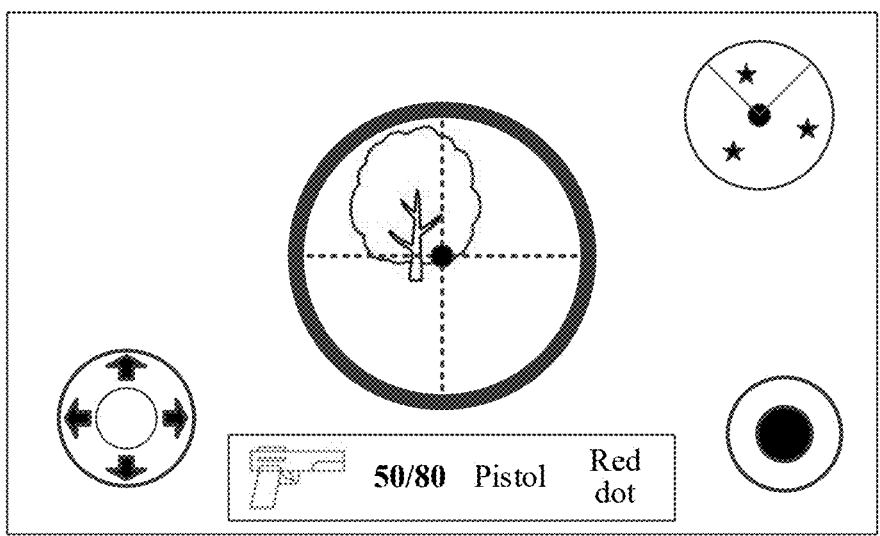
(B)
FIG. 22

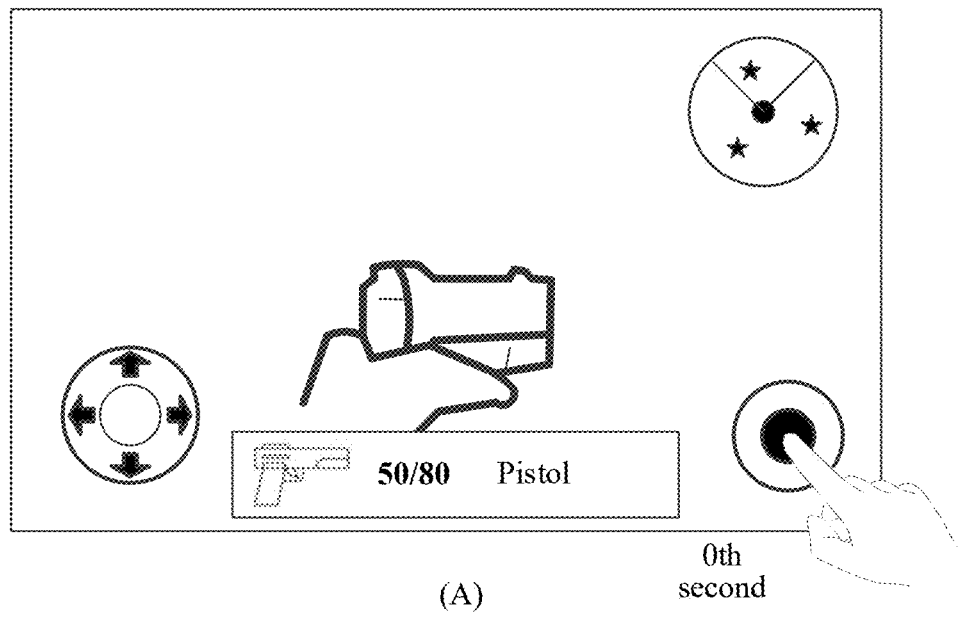
0th
second
(A)
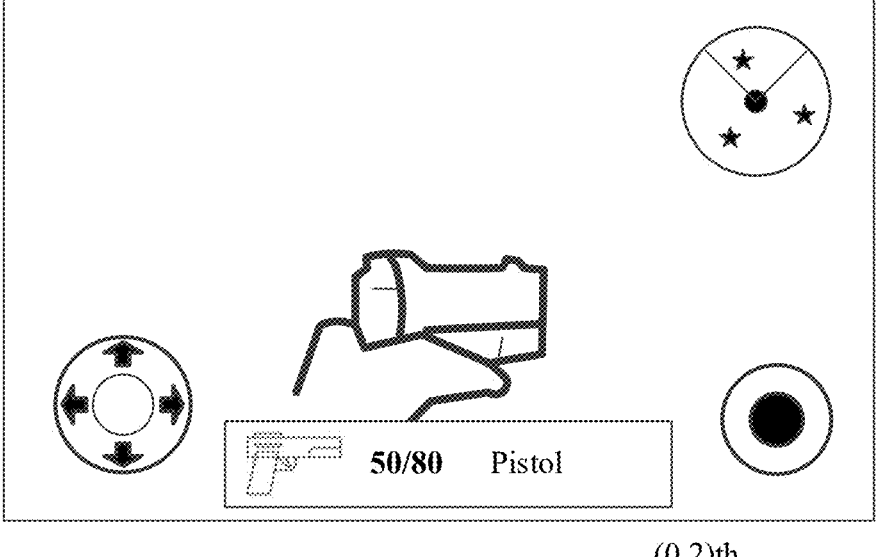
(0.2)th
second
(B)
FIG. 23

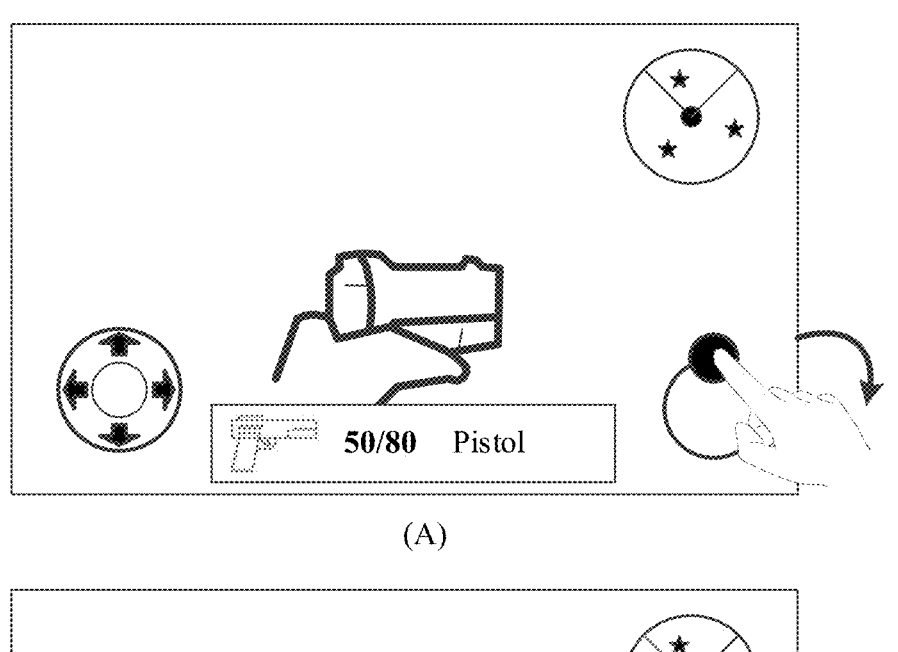
(A)
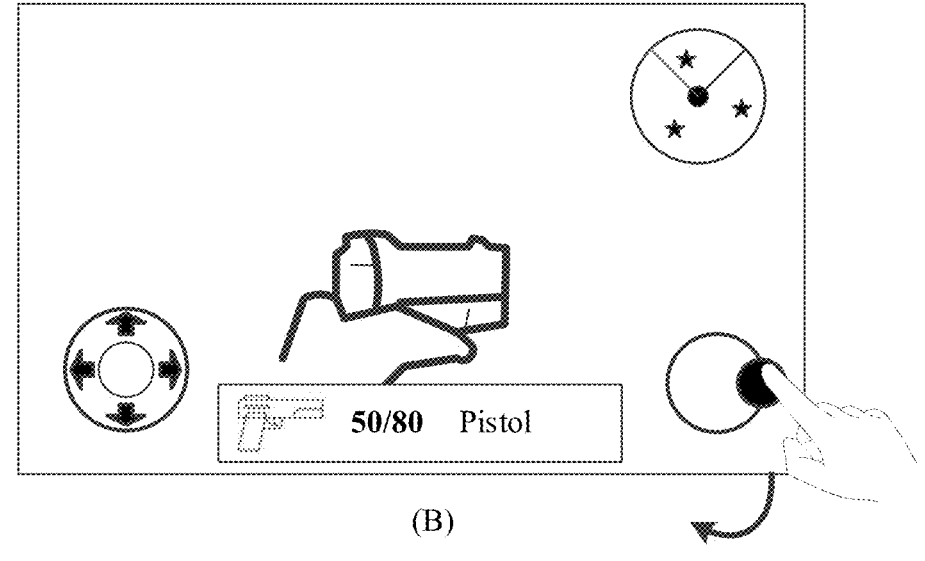
(B)
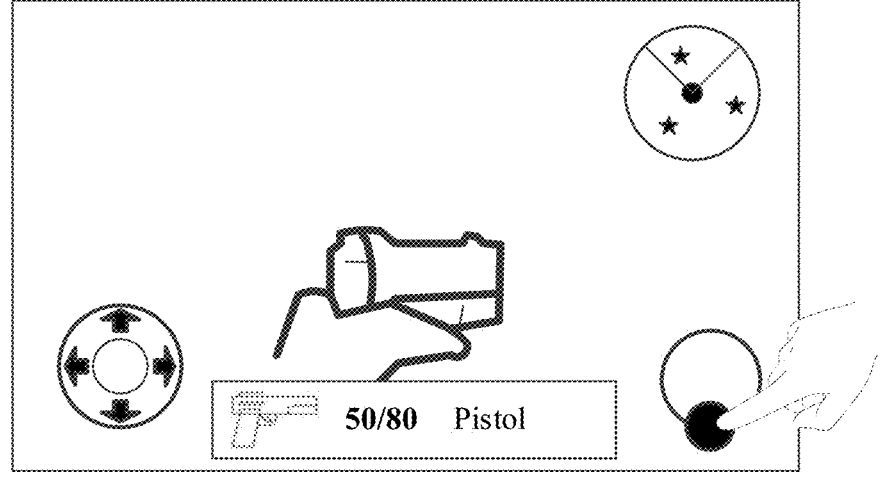
(C)
FIG. 24

Recommended to use:
pistol+red dot sight

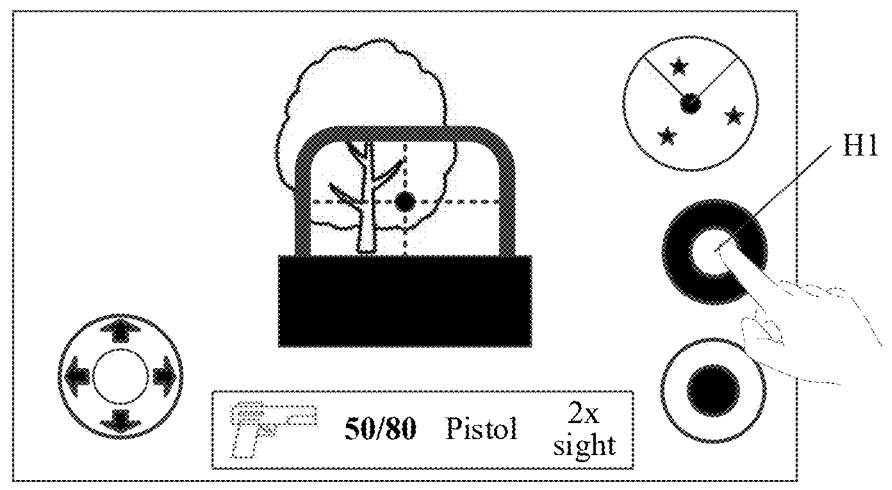
(A)
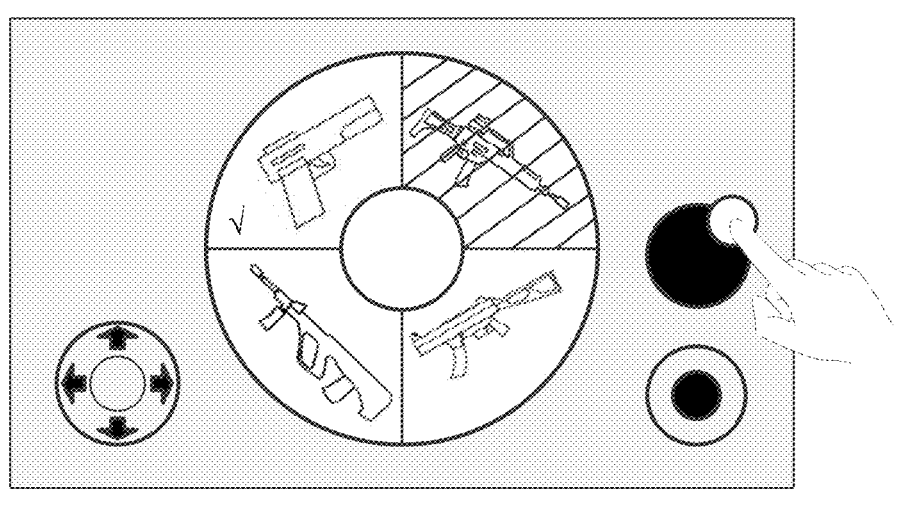
(B)
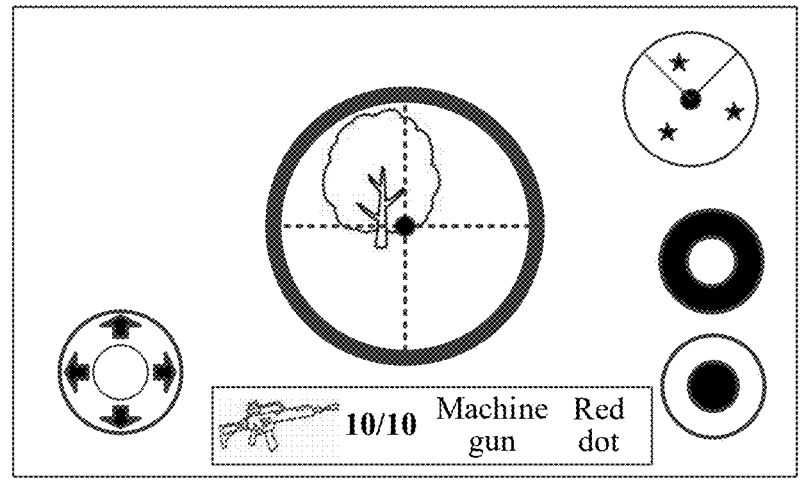
(C)
FIG. 28

VIRTUAL ACCESSORY USING METHOD, RELATED APPARATUS, DEVICE, AND STORAGE MEDIUM

CROSS-REFERENCES TO RELATED APPLICATIONS

This application is a continuation application of PCT Patent Application No. PCT/CN2022/108430, entitled "METHOD FOR USING VIRTUAL ACCESSORY, AND RELATED APPARATUS, DEVICE AND STORAGE MEDIUM" and filed on Jul. 28, 2022, which claims priority to Chinese Patent Application No. 202110950639.6, entitled "VIRTUAL ACCESSORY USING METHOD, RELATED APPARATUS, DEVICE, AND STORAGE MEDIUM" filed with the China National Intellectual Property Administration on Aug. 18, 2021, the entire contents of both of which are incorporated herein by reference.

FIELD OF THE TECHNOLOGY

The present disclosure relates to the field of computer technologies, and in particular, to a virtual accessory using technology.

BACKGROUND OF THE DISCLOSURE

In some shooting game applications (APPs), a virtual operation object controlled by a player often needs to adaptively switch shooting props used by the virtual operation object so as to complete shooting operations for different target objects in a game task. Different shooting props have different attack distances and attack coverage. The player often needs to fit the shooting props with proper accessories so as to increase hit rates for the target objects.

Refitting a shooting prop to improve a shooting effect and prop appearance is one of core playing methods for shooting games. In general, the shooting prop may be fitted with a plurality of virtual accessories to enhance experience of the player in using the shooting prop. For example, the shooting prop may be fitted with a primary sight and a side sight. In this case, the player may switch the primary sight and the side sight by tapping a switching button.

An existing virtual accessory switching solution is single, and virtual accessories cannot be switched freely. For the foregoing problem, there is yet no effective solution at present.

SUMMARY

Embodiments of the present disclosure provide a virtual accessory using method, a related apparatus, a device, and a storage medium. Improvement of virtual accessory switching efficiency is facilitated, and a requirement for efficient and accurate virtual accessory switching is met.

In view of this, an aspect of the present disclosure provides a virtual accessory using method, performed by a terminal device and comprising:

displaying, on a target game interface, a first shooting prop and an accessory switching control for the first shooting prop, the first shooting prop being a shooting prop held by a virtual operation object;

obtaining a first touch operation on the accessory switching control;

displaying an accessory switching region when the first touch operation satisfies a first switching condition, the accessory switching region including at least three accessory slots, and the accessory slot being used for displaying a virtual accessory; and controlling, in response to detecting a selection operation on a first accessory slot, the first shooting prop to use a first virtual accessory, the first accessory slot being any one of the at least three accessory slots, and the first accessory slot being used for displaying the first virtual accessory.

Another aspect of the present disclosure provides a virtual accessory using apparatus, including:

a display module, configured to display, on a target game interface, a first shooting prop and an accessory switching control for the first shooting prop, the first shooting prop being a shooting prop held by a virtual operation object;

an obtaining module, configured to obtain a first touch operation on the accessory switching control, the display module being further configured to display an accessory switching region when the first touch operation satisfies a first switching condition, the accessory switching region including at least three accessory slots, and the accessory slot being used for displaying a virtual accessory; and a control module, configured to control, in response to detecting a selection operation on a first accessory slot, the first shooting prop to use a first virtual accessory, the first accessory slot being any one of the at least three accessory slots, and the first accessory slot being used for displaying the first virtual accessory.

Another aspect of the present disclosure provides a terminal device, including: a memory, a processor, and a bus system.

The memory is configured to store a program.

The processor is configured to execute the program in the memory. The processor is configured to perform the method in each of the foregoing aspects.

The bus system is configured to connect the memory to the processor, such that the memory communicates with the processor.

Another aspect of the present disclosure provides a computer-readable storage medium. The computer-readable storage medium stores instructions, and enables, when run in a computer, the computer to perform the method in each of the foregoing aspects.

Another aspect of the present disclosure provides a computer program product or computer program. The computer program product or computer program includes computer instructions. The computer instructions are stored in a computer-readable storage medium. A processor of a computer device reads the computer instructions from the computer-readable storage medium. The processor executes the computer instructions to enable the computer device to perform the method provided in each of the foregoing aspects.

It can be seen from the foregoing technical solutions that the embodiments of the present disclosure have the following advantages.

The embodiments of the present disclosure provide the virtual accessory using method. First, a first shooting prop and an accessory switching control for the first shooting prop are displayed on a target game interface. The first shooting prop is a shooting prop held by a virtual operation object. Then, a first touch operation on the accessory switching control is obtained. An accessory switching region is displayed when the first touch operation satisfies a first switching condition. The accessory switching region includes at least three accessory slots. The accessory slot is used for displaying a virtual accessory. The first shooting prop is controlled to use a first virtual accessory in response to detecting a selection operation on a first accessory slot. According to the method, free switching between at least three virtual accessories may be supported for a shooting prop. In addition, a player may view a virtual accessory for switching at an accessory slot. Improvement of virtual accessory switching efficiency is facilitated, and a requirement for efficient and accurate virtual accessory switching is met.

BRIEF DESCRIPTION OF THE DRAWINGS

FIG. 3 is a schematic flowchart of a virtual accessory using method according to an embodiment of the present disclosure.

FIG. 4 is a schematic diagram of an interface of a target game APP according to an embodiment of the present disclosure.

FIG. 8 is a schematic diagram of another interface on which a first switching condition is triggered according to an embodiment of the present disclosure.

FIG. 21 is a schematic diagram of an interface on which virtual accessory switching is completed according to an embodiment of the present disclosure.

FIG. 22 is a schematic diagram of another interface on which virtual accessory switching is completed according to an embodiment of the present disclosure.

FIG. 23 is a schematic diagram of an interface on which a second switching condition is triggered according to an embodiment of the present disclosure.

FIG. 24 is a schematic diagram of another interface on which a second switching condition is triggered according to an embodiment of the present disclosure.

FIG. 28 is a schematic diagram of an interface on which a shooting prop is switched according to an embodiment of the present disclosure.

DESCRIPTION OF EMBODIMENTS

With continuous enrichment of game content, there are more and more shooting props in a game, and a player may fit the shooting props with proper virtual accessories. This can test the player in rational use of various virtual accessories. The virtual accessories include but are not limited to a red dot sight, a holographic sight, a 2× sight, a 4× sight, a 6× sight, an 8× sight, and the like. Rational use of the virtual accessories can enrich and improve tactics of the player. However, virtual accessory switching efficiency and accuracy often affect a shooting level of the player. In the game, the player may switch different virtual accessories after tapping a throwing control.

Figure 1:
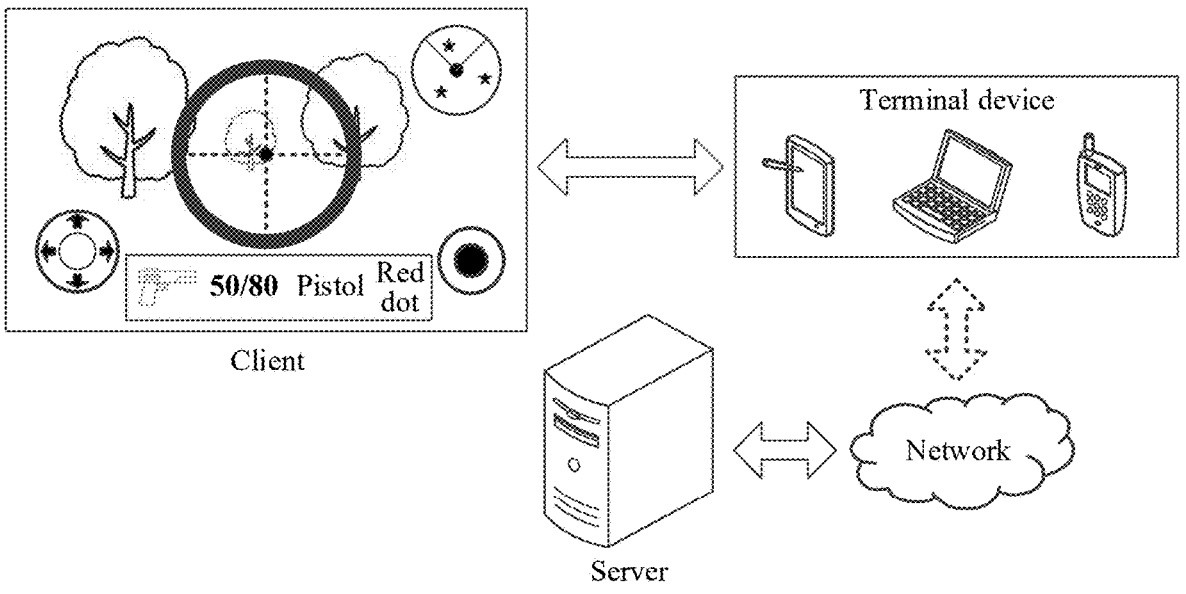
FIG. 1 is a schematic diagram of an application environment of a virtual accessory using system according to an embodiment of the present disclosure.

The present disclosure proposes a virtual accessory using method, to improve virtual accessory switching efficiency and degree of freedom. The method is applied to a virtual accessory using system shown in FIG. 1. As shown in the figure, for a single-player game, the virtual accessory using system includes a terminal device. For an online game, the virtual accessory using system includes a terminal device and a server. A game client is deployed in the terminal device. The game client may be run in the terminal device in a form of a browser, or may be run in the terminal device in a form of an independent APP. A specific representation form of the game client is not limited herein. The server involved in the present disclosure may be an independent physical server, or a server cluster or distributed system including a plurality of physical servers, or a cloud server providing a basic cloud computing service such as a cloud service, a cloud database, cloud computing, a cloud function, cloud storage, a network service, cloud communication, a middleware service, a domain name service, a security service, a content delivery network (CDN), or a big data and artificial intelligence platform. The terminal device involved in the present disclosure may be but is not limited to a smartphone, a tablet computer, a notebook computer, a palm computer, a personal computer, a smart television, a smartwatch, an in-vehicle device, a wearable device, or the like. The terminal device may be directly or indirectly connected to the server through wired or wireless communication. This is not limited herein in the present disclosure. Quantities of servers and terminal devices are also not limited. A solution provided in the present disclosure may be completed independently by the terminal device, or independently by the server, or cooperatively by the terminal device and the server. This is not specifically limited in the present disclosure.

It may be understood that a game involved in the present disclosure may be cloud gaming. Cloud gaming, also referred to as gaming on demand, is an online gaming technology based on a cloud computing technology. Through the cloud gaming technology, a high-quality game may be run by using a thin client with limited graphics processing and data operation capabilities. In a cloud gaming scene, the game is run not in a game terminal of a player but in a cloud server, and the cloud server renders the gaming scene into a video/audio stream, and transmits the audio/video stream to the game terminal of the player through a network. The game terminal of the player does not need to have high graphics operation and data processing capabilities, but needs to have only a basic streaming media playing capability and a capability of obtaining an input instruction of the player and sending the input instruction to the cloud server.

Figure 2:
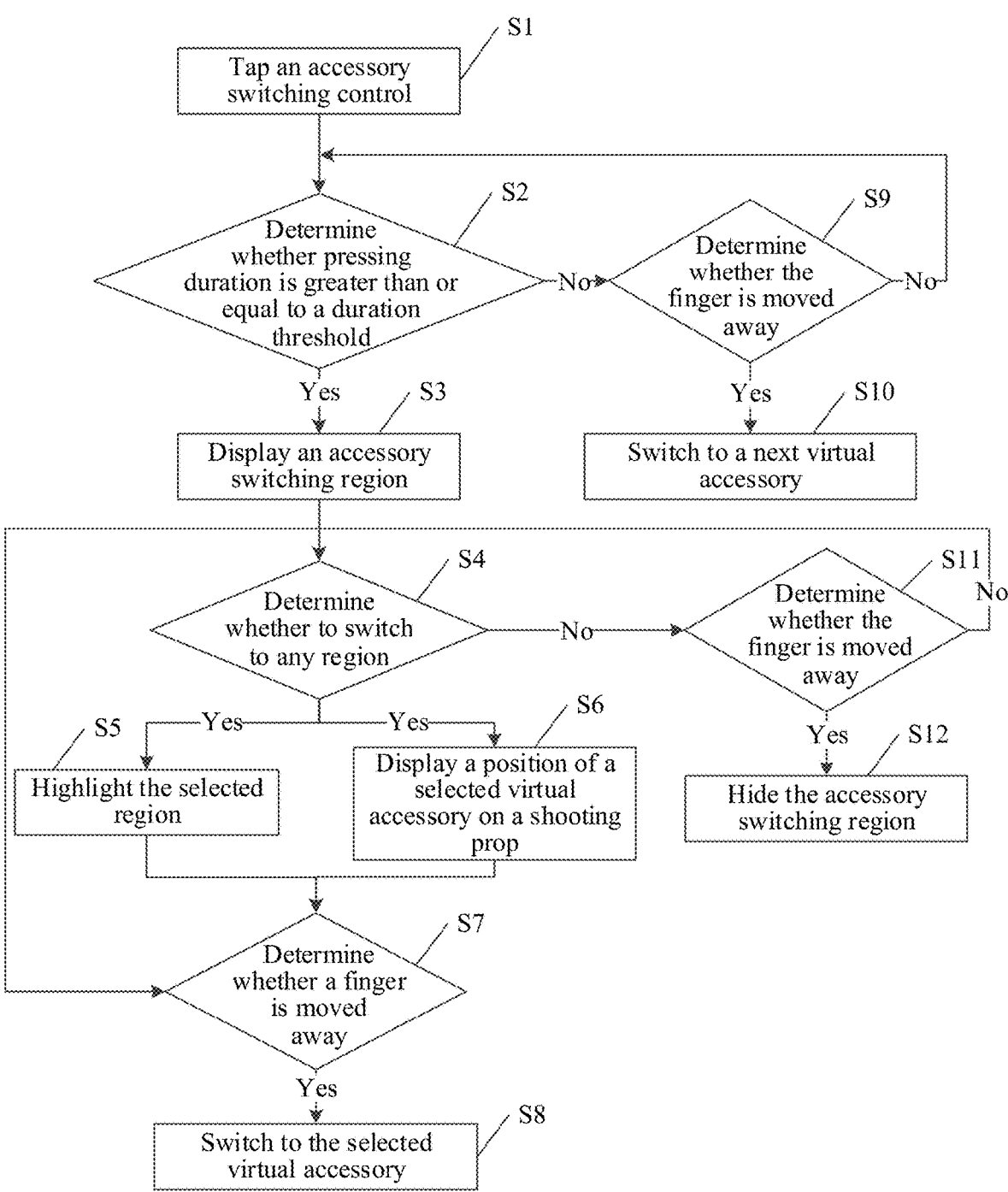
FIG. 2 is a schematic flowchart of triggering a virtual accessory switching function according to an embodiment of the present disclosure.

Based on this, an example of triggering a virtual accessory switching function will be described below with reference to FIG. 2. For ease of understanding, refer to FIG. 2. FIG. 2 is a schematic flowchart of triggering the virtual accessory switching function according to an embodiment of the present disclosure. As shown in the figure, the following steps are specifically included:

Step S1: The player presses an accessory switching control provided on an interface after entering a target game APP.

Step S2: Determine whether pressing duration of the player for the accessory switching control is greater than or equal to a duration threshold. If the pressing duration for the accessory switching control is greater than or equal to the duration threshold, step S3 is performed; or if the pressing duration for the accessory switching control is less than the duration threshold, step S9 is performed.

Step S3: Display an accessory switching region on the interface of the target game APP.

Step S4: The player selects, through dragging, a virtual accessory for switching in the accessory switching region. In this way, whether the player selects any region in the accessory switching region is determined. If a specific region is selected, step S5 and step S6 are performed; or if no region is selected, step S11 is performed.

Step S5: Highlight the selected region in the accessory switching region.

Step S6: Display, in the accessory switching region, a position of the selected virtual accessory on a shooting prop. The shooting prop can be any virtual weapon with accessories, such as any types of virtual guns with different types of sights.

Step S7: Determine whether a finger of the player is moved away. If the finger is moved away, step S8 is performed.

Step S8: Switch to the virtual accessory selected by the player.

Step S9: Determine whether a finger of the player is moved away. If the finger is moved away, step S10 is performed; or if the finger is not moved away, step S2 is performed. Step S10: Switch to a next virtual accessory.

Step S11: Determine whether a finger of the player is moved away. If the finger is moved away, step S12 is performed; or if the finger is not moved away, step S7 continues to be performed.

Step S12: Hide (or close) the accessory switching region.

With reference to the above description, the virtual accessory using method in the present disclosure will be described below. Referring to FIG. 3, an embodiment of the virtual accessory using method in the embodiments of the present disclosure includes the following steps:

110: The terminal device displays, on a target game interface, a first shooting prop and an accessory switching control for the first shooting prop, the first shooting prop being a shooting prop held by a virtual operation object.

In one or more embodiments, the target game APP may be run in the terminal device, and the first shooting prop and the accessory switching control for the first shooting prop may be displayed on a game interface (that is, the target game interface) provided by the target game APP. It is to be noted that the target game APP includes but is not limited to an action game (ACT), a shooting game (STG), a fighting game (FTG), an adventure game (AVG), a role-playing game (RPG), and the like. This is not limited herein. The virtual operation object is a game role controlled by the player. The first shooting prop includes but is not limited to a "pistol" prop, a "rifle" prop, a "shotgun" prop, a "submachine gun" prop, and the like. This is not limited herein. The virtual accessory includes but is not limited to a red dot sight, a holographic sight, a 2× sight, a 4× sight, a 6× sight, an 8× sight, and the like. This is not limited herein.

Specifically, for ease of description, refer to FIG. 4. FIG. 4 is a schematic diagram of the target game interface according to an embodiment of the present disclosure. As shown in the figure, A1 is used for denoting the first shooting prop (for example, the "pistol" prop shown in FIG. 4) currently used by the virtual operation object, and A2 is used for denoting the accessory switching control. The accessory switching control is used for switching to a virtual accessory with which the first shooting prop is fitted. It is to be noted that the interface shown in FIG. 4 is merely schematic, whose layout may be adjusted in actual applications, and thus cannot be understood as a limitation on the present disclosure.

120: The terminal device obtains a first touch operation on the accessory switching control.

In one or more embodiments, the player initiates a touch operation on the accessory switching control, and then the terminal device obtains the first touch operation on the accessory switching control. The first touch operation includes but is not limited to one or more of touch and hold, slide, click, double-click, drag, and the like.

130: The terminal device displays an accessory switching region when the first touch operation satisfies a first switching condition, the accessory switching region including at least three accessory slots, and the accessory slot being used for displaying a virtual accessory.

In one or more embodiments, the terminal device determines whether the first touch operation satisfies the first switching condition, and if the first touch operation satisfies the first switching condition, displays the accessory switching region on the target game interface. The accessory switching region includes the at least three accessory slots. One virtual accessory corresponding to the first shooting prop may be displayed at each accessory slot.

Specifically, in order to present a refitting degree of freedom in reality, switching between at least three virtual accessories may be supported for a shooting prop. For example, the first shooting prop is the "pistol". It is assumed that the accessory switching region includes three accessory slots (respectively an accessory slot 1, an accessory slot 2, and an accessory slot 3), and the first shooting prop has three virtual accessories (respectively a virtual accessory A, a virtual accessory B, and a virtual accessory C). Based on this, the virtual accessory A is displayed at the accessory slot 1, the virtual accessory B is displayed at the accessory slot 2, and the virtual accessory C is displayed at the accessory slot 3.

140: The terminal device controls, in response to detecting a selection operation on a first accessory slot, the first shooting prop to use a first virtual accessory, the first accessory slot being any one of the at least three accessory slots, and the first accessory slot being used for displaying the first virtual accessory.

In one or more embodiments, the terminal device controls, in response to detecting the selection operation on the first accessory slot, the first shooting prop to use the first virtual accessory. The first accessory slot is any one of the at least three accessory slots. That is, the first accessory slot is any accessory slot in the accessory switching region. The first accessory slot is in correspondence to the first virtual accessory. That is, the first virtual accessory is displayed at the first accessory slot.

It is to be noted that if the first shooting prop is fitted with no virtual accessory, each accessory slot is empty. If the first shooting prop is fitted with one virtual accessory, the virtual accessory is displayed at one accessory slot, and each other accessory slot is empty. For ease of description, an example in which the first shooting prop is fitted with at least one virtual accessory, that is, has at least the first virtual accessory displayed at the first accessory slot, is used in the present disclosure for description.

Figure 5:
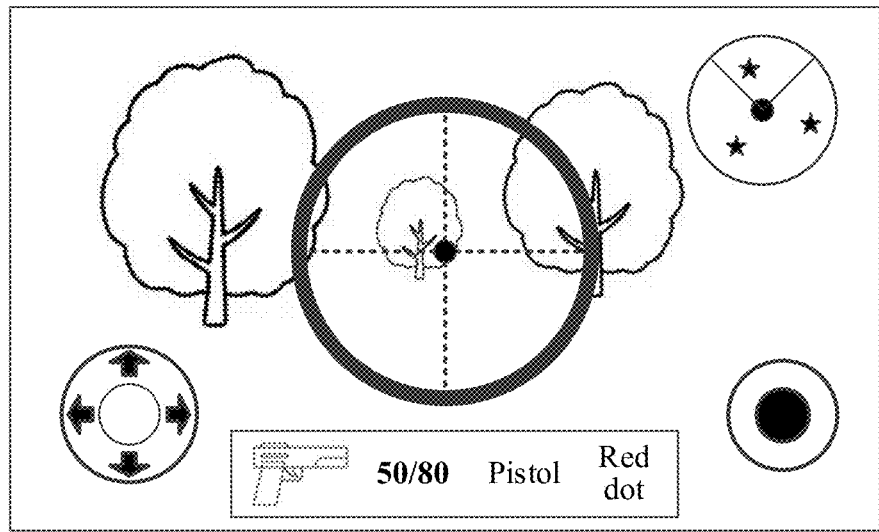
FIG. 5 is a schematic diagram of an interface on which a virtual accessory is used for a shooting prop according to an embodiment of the present disclosure.

Specifically, for ease of description, refer to FIG. 5. FIG. 5 is a schematic diagram of an interface on which a virtual accessory is used for a shooting prop according to an embodiment of the present disclosure. As shown in the figure, an example in which the first shooting prop is the "pistol" prop is used as an example, and the first virtual accessory used by the first shooting prop is the "red dot sight". It is to be noted that the interface shown in FIG. 5 is merely schematic, whose layout may be adjusted in actual applications, and thus cannot be understood as a limitation on the present disclosure.

This embodiment of the present disclosure provides the virtual accessory using method. According to the method, free switching between at least three virtual accessories may be supported for a shooting prop. In addition, the player may further view a virtual accessory for switching at an accessory slot. Improvement of virtual accessory switching efficiency is facilitated, and a requirement for efficient and accurate virtual accessory switching is met.

In some embodiments, based on each embodiment corresponding to FIG. 3, in another example embodiment provided in the embodiments of the present disclosure, after the operation that the terminal device obtains a first touch operation for the accessory switching control, the method may further include that:

the terminal device determines, in response to detecting that stay duration of a contact of the first touch operation on the accessory switching control is greater than or equal to a duration threshold, that the first touch operation satisfies the first switching condition;

or the terminal device determines, in response to detecting in preset duration that a quantity of occurrences of a contact of the first touch operation on the accessory switching control is greater than or equal to a quantity threshold, that the first touch operation satisfies the first switching condition;

or the terminal device determines, in response to detecting that a movement distance of a contact of the first touch operation on the accessory switching control is greater than or equal to a distance threshold, that the first touch operation satisfies the first switching condition.

In one or more embodiments, various manners in which whether the first switching condition is satisfied is determined are described. It can be seen from the foregoing embodiments that when the first touch operation satisfies the first switching condition, the accessory switching region may be called up, that is, the accessory switching region is displayed on the terminal device. A specific case in which the first switching condition is satisfied will be described below with reference to an example.

First: touch and hold the accessory switching control.

Figure 6:
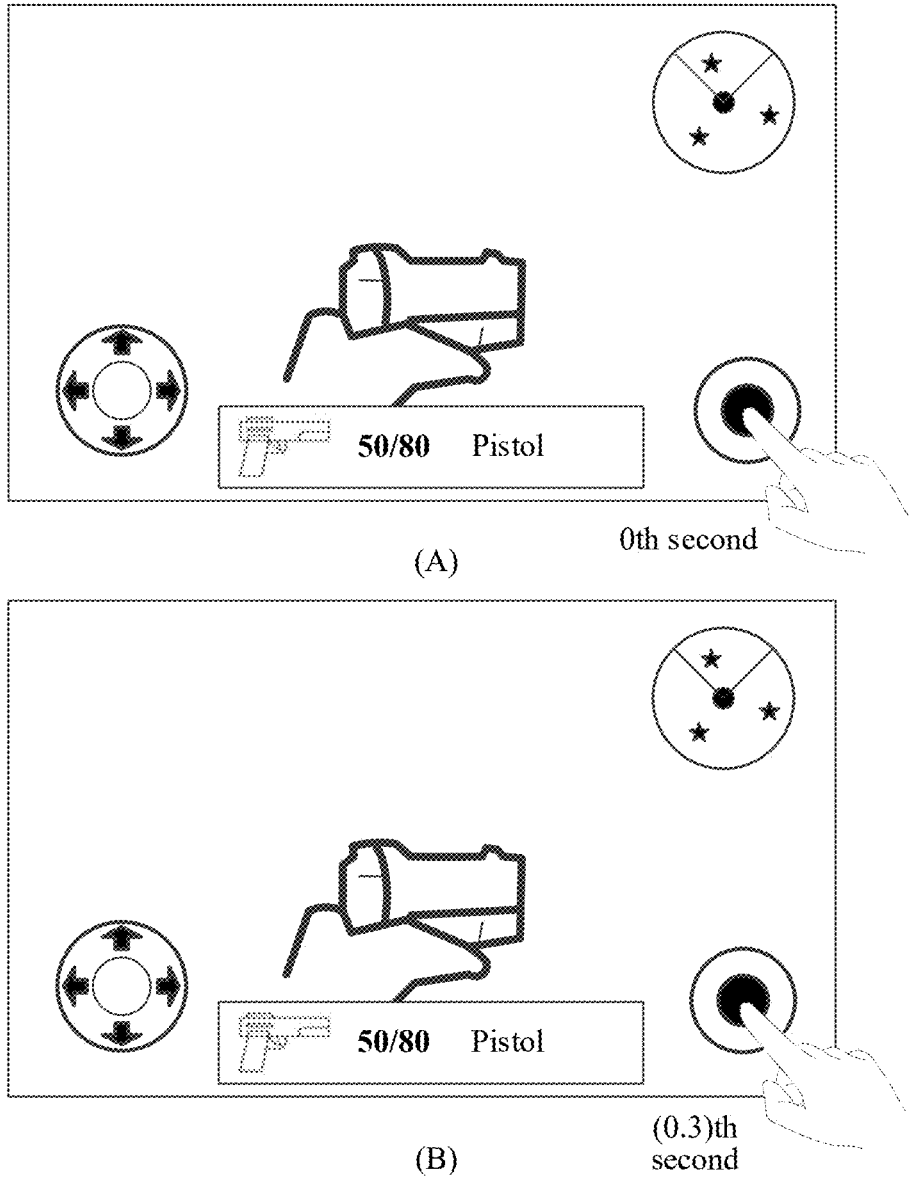
FIG. 6 is a schematic diagram of an interface on which a first switching condition is triggered according to an embodiment of the present disclosure.

For example, for ease of understanding, refer to FIG. 6. FIG. 6 is a schematic diagram of an interface on which the first touch operation satisfying the first switching condition is triggered according to an embodiment of the present disclosure. An example in which the duration threshold is 0.3 seconds is used, and it is assumed that the accessory switching control is circular. As shown in (A) in FIG. 6, the finger is put on a screen of the terminal device. A contact of the finger is the contact of the first touch operation. At a starting moment (that is, a 0th second), the finger of the player is put on the accessory switching control, and timing is started. As shown in (B) in FIG. 6, the finger remains on the accessory switching control at a (0.3)th second. Based on this, the terminal device determines that stay duration of the contact on the accessory switching control is greater than or equal to the duration threshold, and thus determines that the first touch operation satisfies the first switching condition.

It is to be noted that the interface shown in FIG. 6 is merely schematic, whose layout may be adjusted in actual applications, and thus cannot be understood as a limitation on the present disclosure.

Second: double-click the accessory switching control.

Figure 7:
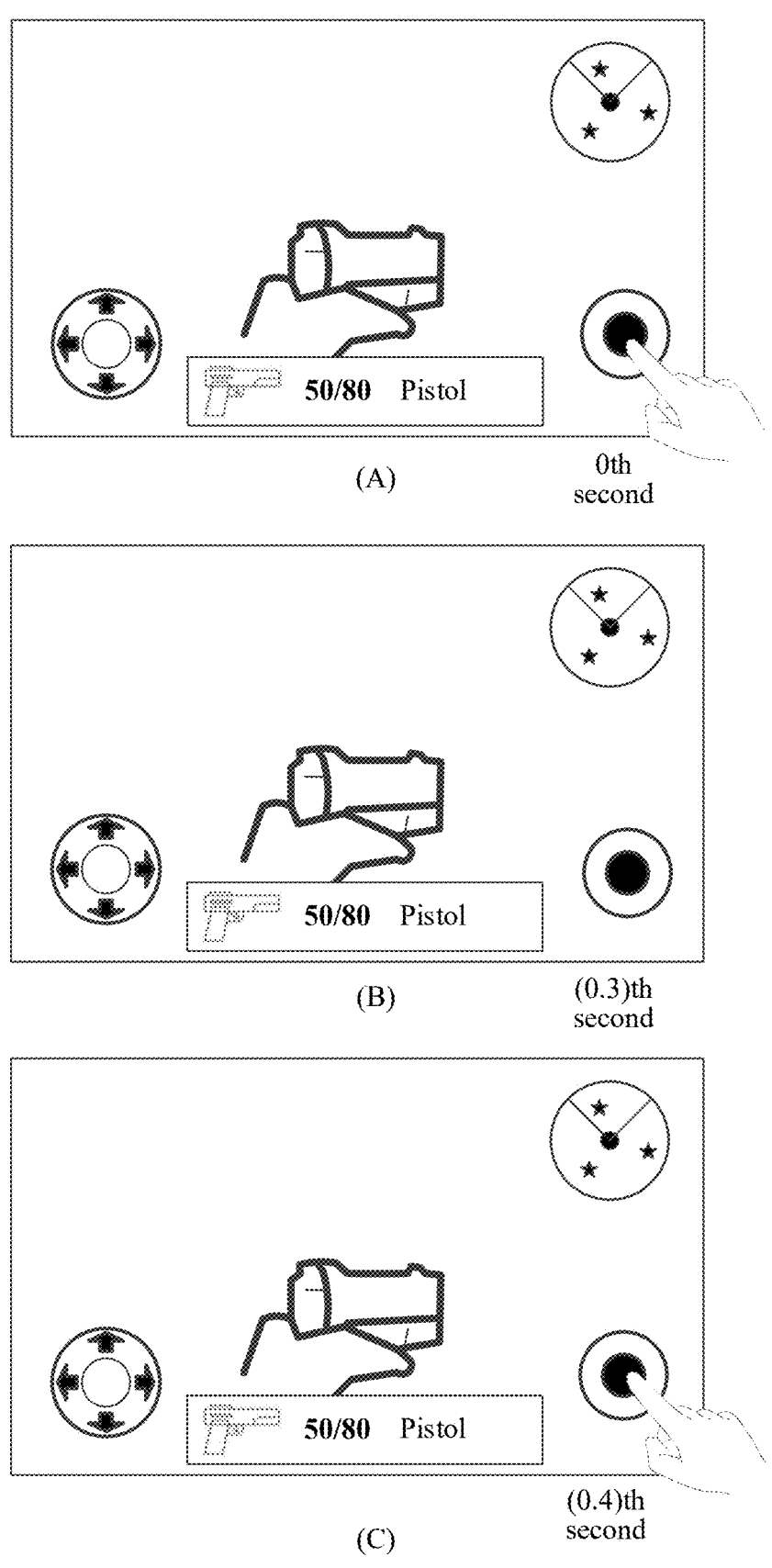
FIG. 7 is a schematic diagram of another interface on which a first switching condition is triggered according to an embodiment of the present disclosure.

For example, for ease of understanding, refer to FIG. 7. FIG. 7 is a schematic diagram of another interface on which the first touch operation satisfying the first switching condition is triggered according to an embodiment of the present disclosure. An example in which the preset duration is 0.5 seconds and the quantity threshold is 2 is used, and it is assumed that the accessory switching control is circular. As shown in (A) in FIG. 7, the finger is put on a screen of the terminal device. A contact of the finger is the contact of the first touch operation. At a starting moment (that is, a 0th second), the finger of the player is put on the accessory switching control, and timing is started. As shown in (B) in FIG. 7, the finger of the player is moved away at the (0.3)th second. As shown in (C) in FIG. 7, the finger of the player is put again on the accessory switching control at the (0.4)th second. Based on this, the terminal device determines that it is detected in the preset duration that a quantity of occurrences of the contact on the accessory switching control is greater than or equal to the quantity threshold, and thus determines that the first touch operation satisfies the first switching condition.

It is to be noted that the interface shown in FIG. 7 is merely schematic, whose layout may be adjusted in actual applications, and thus cannot be understood as a limitation on the present disclosure.

Third: slide the accessory switching control.

For example, for ease of understanding, refer to FIG. 8. FIG. 8 is a schematic diagram of another interface on which the first touch operation satisfying the first switching condition is triggered according to an embodiment of the present disclosure. An example in which the distance threshold is a length of the accessory switching control is used, and it is assumed that the accessory switching control is a slide bar. As shown in (A) in FIG. 8, the finger is put on a screen of the terminal device. A contact of the finger is the contact of the first touch operation. The finger of the player is put on the accessory switching control, and then slides down. As shown in (B) in FIG. 8, the finger of the player moves to a bottom of the accessory switching control. Based on this, the terminal device determines a movement distance of the contact on the accessory switching control is greater than or equal to the distance threshold, and thus determines that the first touch operation satisfies the first switching condition.

It is to be noted that the interface shown in FIG. 8 is merely schematic, whose layout may be adjusted in actual applications, and thus cannot be understood as a limitation on the present disclosure. In addition, the player may slide the accessory switching control in any other direction to trigger the first touch operation. This is not limited herein.

This embodiment of the present disclosure provides various manners in which whether the first touch operation on the accessory switching control satisfies the first switching condition is determined. In this manner, the player may trigger the first switching condition by pressing the accessory switching control for long time, or the player may trigger the first switching condition by double-clicking the accessory switching control, or the player may trigger the first switching condition by sliding the accessory switching control. Therefore, various feasible implementations are provided for the solution, improving diversity and flexibility of the solution.

In some embodiments, based on each embodiment corresponding to FIG. 3, in another example embodiment provided in the embodiments of the present disclosure, the accessory switching region includes a ring region, the ring region is divided into at least three sector ring regions, and each sector ring region is an accessory slot.

In one or more embodiments, a manner in which the accessory switching region of a ring structure is displayed is described. It can be seen from the foregoing embodiments that the accessory switching region includes the at least three accessory slots. The following uses an example in which the accessory switching region includes four accessory slots for description.

Figure 9:
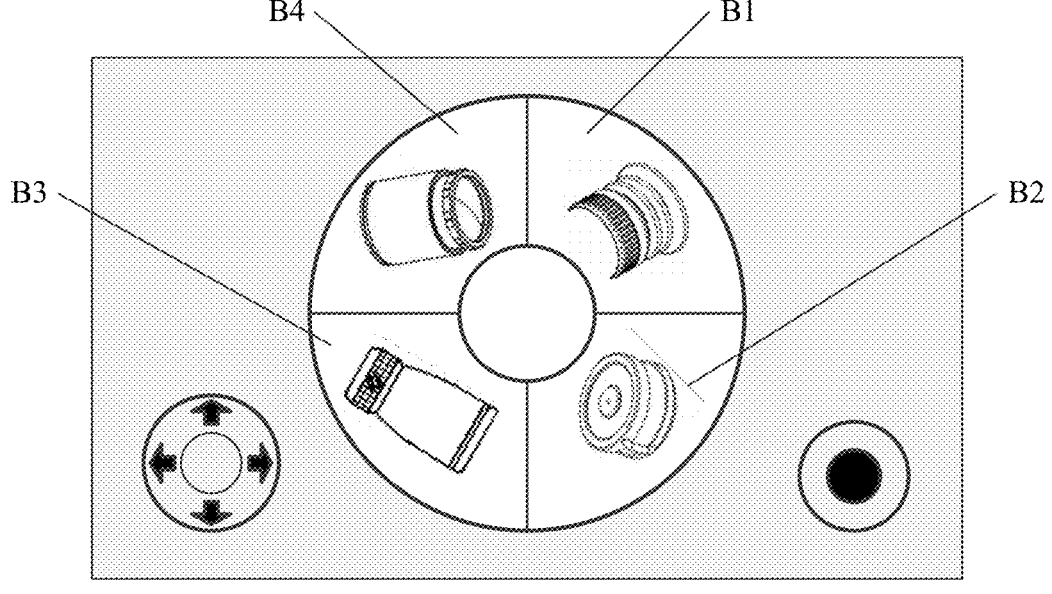
FIG. 9 is a schematic diagram of an interface on which an accessory switching region is displayed according to an embodiment of the present disclosure.

Specifically, for ease of understanding, refer to FIG. 9. FIG. 9 is a schematic diagram of an interface on which the accessory switching region is displayed according to an embodiment of the present disclosure. As shown in the figure, the accessory switching region may be represented as a ring region. The ring region is equally divided into at least four sector ring regions, respectively a first sector ring region denoted as B1, a second sector ring region denoted as B2, a third sector ring region denoted as B3, and a fourth sector ring region denoted as B4. Each sector ring region is represented as an accessory slot. It is to be noted that corresponding virtual accessories are displayed in all the four accessory slots shown in FIG. 9. However, no virtual accessory may be displayed in the accessory slot in actual applications. In addition, the ring region may be equally divided into another quantity of sector ring regions, the quantity being an integer greater than or equal to 3.

It is to be noted that the interface shown in FIG. 9 is merely schematic, whose layout may be adjusted in actual applications, and thus cannot be understood as a limitation on the present disclosure.

This embodiment of the present disclosure provides the manner in which the accessory switching region of the ring structure is displayed. In this manner, the sector ring region may be used as the accessory slot, and the virtual accessory is displayed at the accessory slot. Therefore, a rational solution is provided for display of the virtual accessory, improving feasibility and flexibility of the solution.

In some embodiments, based on each embodiment corresponding to FIG. 3, in another example embodiment provided in the embodiments of the present disclosure, the accessory switching region includes a circular region, the circular region is divided into at least three sector regions, and each sector region is an accessory slot.

In one or more embodiments, a manner in which the accessory switching region of a circular structure is displayed is described. It can be seen from the foregoing embodiments that the accessory switching region includes the at least three accessory slots. The following uses an example in which the accessory switching region includes four accessory slots for description.

Figure 10:
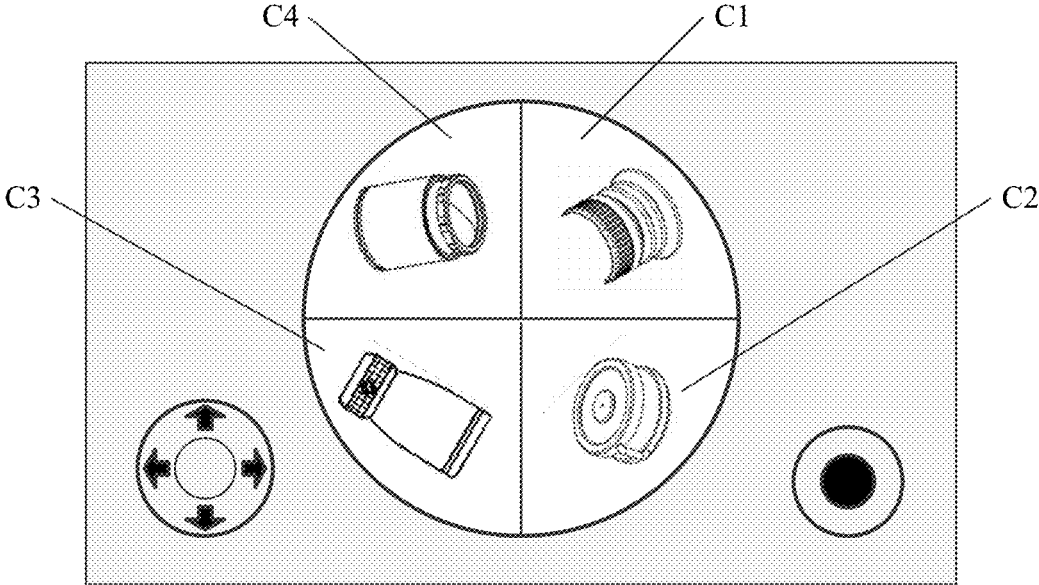
FIG. 10 is a schematic diagram of another interface on which an accessory switching region is displayed according to an embodiment of the present disclosure.

Specifically, for ease of understanding, refer to FIG. 10. FIG. 10 is a schematic diagram of another interface on which the accessory switching region is displayed according to an embodiment of the present disclosure. As shown in the figure, the accessory switching region may be represented as a circular region. The circular region is equally divided into at least four sector regions, respectively a first sector region denoted as C1, a second sector region denoted as C2, a third sector region denoted as C3, and a fourth sector region denoted as C4. Each sector region is represented as an accessory slot. It is to be noted that corresponding virtual accessories are displayed in all the four accessory slots shown in FIG. 10. However, no virtual accessory may be displayed in the accessory slot in actual applications. In addition, the circular region may be equally divided into another quantity of sector regions, the quantity being an integer greater than or equal to 3.

It is to be noted that the interface shown in FIG. 10 is merely schematic, whose layout may be adjusted in actual applications, and thus cannot be understood as a limitation on the present disclosure.

This embodiment of the present disclosure provides the manner in which the accessory switching region of the circular structure is displayed. In this manner, the sector region may be used as the accessory slot, and the virtual accessory is displayed at the accessory slot. Therefore, a rational solution is provided for display of the virtual accessory, improving feasibility and flexibility of the solution.

In some embodiments, based on each embodiment corresponding to FIG. 3, in another example embodiment provided in the embodiments of the present disclosure, the accessory switching region includes a rectangular region, the rectangular region is divided into at least three matrix sub-regions, and each matrix sub-region is an accessory slot.

In one or more embodiments, a manner in which the accessory switching region of a rectangular structure is displayed is described. It can be seen from the foregoing embodiments that the accessory switching region includes the at least three accessory slots. The following uses an example in which the accessory switching region includes four accessory slots for description.

Figure 11:
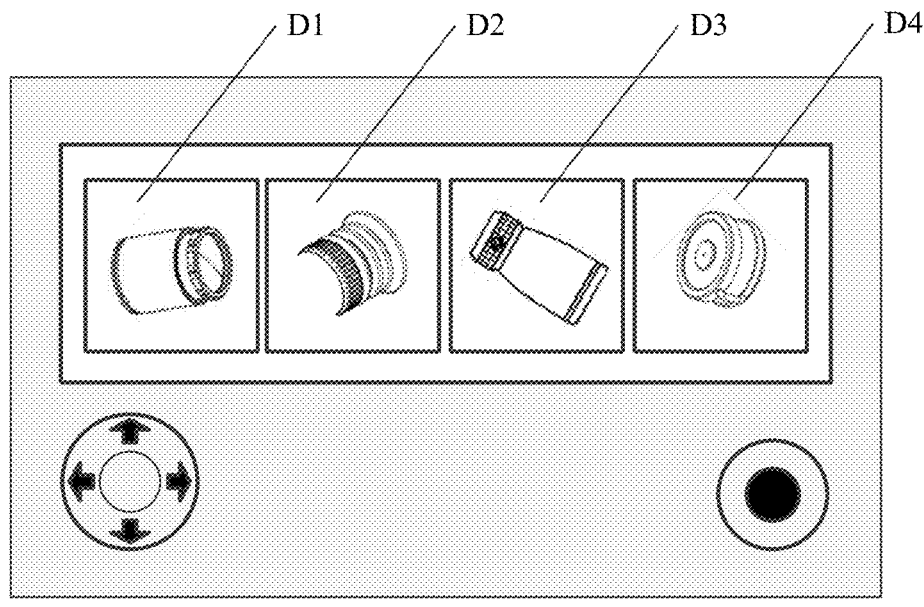
FIG. 11 is a schematic diagram of another interface on which an accessory switching region is displayed according to an embodiment of the present disclosure.

Specifically, for ease of understanding, refer to FIG. 11. FIG. 11 is a schematic diagram of another interface on which the accessory switching region is displayed according to an embodiment of the present disclosure. As shown in the figure, the accessory switching region may be represented as a rectangular region. The rectangular region is equally divided into at least four matrix sub-regions, respectively a first matrix sub-region denoted as D1, a second matrix sub-region denoted as D2, a third matrix sub-region denoted as D3, and a fourth matrix sub-region denoted as D4. Each matrix sub-region is represented as an accessory slot. It is to be noted that corresponding virtual accessories are displayed in all the four accessory slots shown in FIG. 11. However, no virtual accessory may be displayed in the accessory slot in actual applications. In addition, the rectangular region may be equally divided into another quantity of matrix sub-regions, the quantity being an integer greater than or equal to 3.

It is to be noted that the interface shown in FIG. 11 is merely schematic, whose layout may be adjusted in actual applications, and thus cannot be understood as a limitation on the present disclosure.

This embodiment of the present disclosure provides the manner in which the accessory switching region of the rectangular structure is displayed. In this manner, the matrix sub-region may be used as the accessory slot, and the virtual accessory is displayed at the accessory slot. Therefore, a rational solution is provided for display of the virtual accessory, improving feasibility and flexibility of the solution.

In some embodiments, based on each embodiment corresponding to FIG. 3, in another example embodiment provided in the embodiments of the present disclosure, the first shooting prop is fitted with K virtual accessories, and K is an integer greater than or equal to 1.

The method may further include that:

The terminal device highlights the first accessory slot in the accessory switching region in response to detecting a viewing operation on the first accessory slot.

In one or more embodiments, a manner in which the first accessory slot is highlighted is described. It can be seen from the foregoing embodiments that the accessory switching region may be represented as the ring region, the circular region, or the rectangular region, and the accessory switching region includes the at least three accessory slots. The following uses an example in which the accessory switching region includes four accessory slots for description.

First: the accessory switching region is represented as the ring region.

Figure 12:
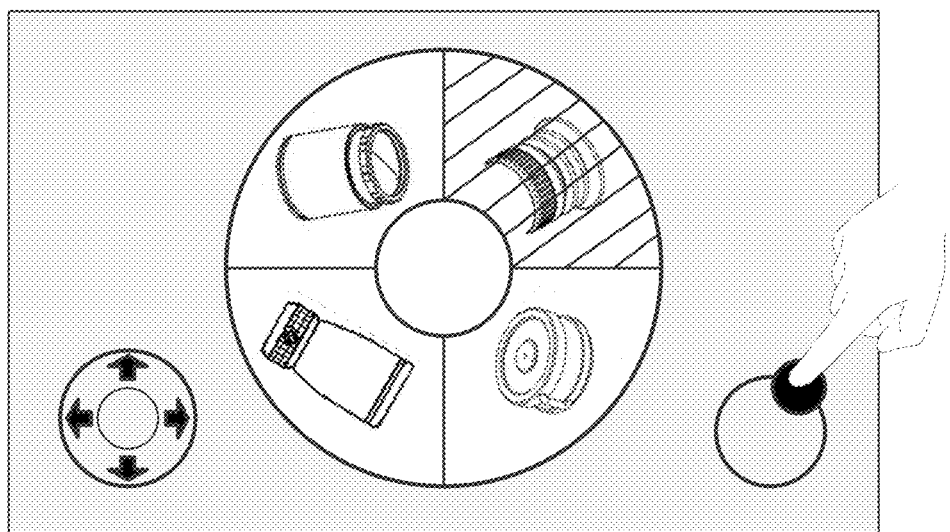
FIG. 12 is a schematic diagram of an interface on which a first accessory slot is highlighted according to an embodiment of the present disclosure.

For example, for ease of understanding, refer to FIG. 12. FIG. 12 is a schematic diagram of an interface on which the first accessory slot is highlighted according to an embodiment of the present disclosure. As shown in the figure, the player presses and drags the accessory switching control in a specific direction. In this case, a viewing operation on a specific accessory slot may be triggered. FIG. 12 is used as an example. It is assumed that the viewing operation on the first accessory slot is triggered by dragging to the top right.

In this case, a selected top-right sector ring region is highlighted in the accessory switching region. The sector ring region is the first accessory slot.

It is to be noted that the interface shown in FIG. 12 is merely schematic, and a position of the first accessory slot in the accessory switching region in FIG. 12 is also schematic, which cannot be understood as a limitation on the present disclosure.

Second: the accessory switching region is represented as the circular region.

Figure 13:
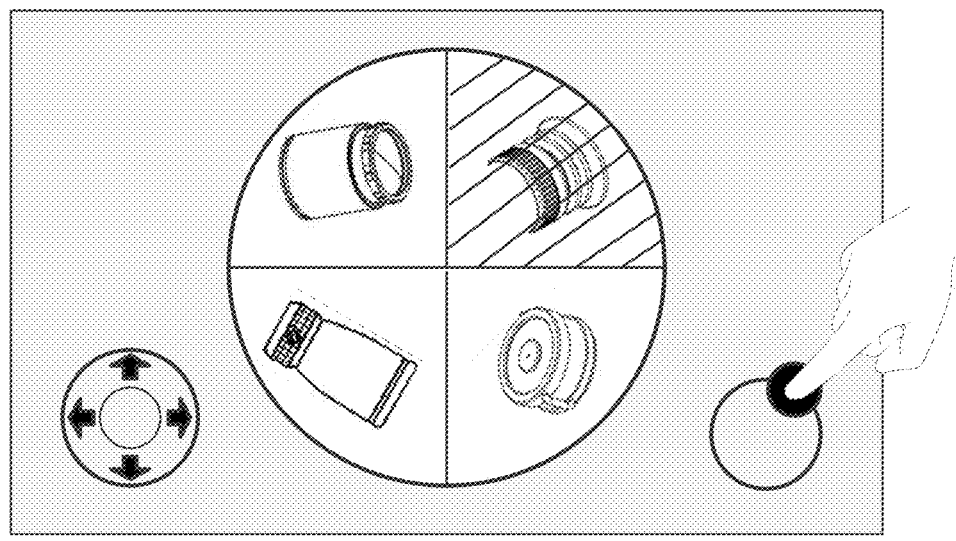
FIG. 13 is a schematic diagram of another interface on which a first accessory slot is highlighted according to an embodiment of the present disclosure.

For example, for ease of understanding, refer to FIG. 13. FIG. 13 is a schematic diagram of another interface on which the first accessory slot is highlighted according to an embodiment of the present disclosure. As shown in the figure, the player presses and drags the accessory switching control in a specific direction. In this case, a viewing operation on a specific accessory slot may be triggered. FIG. 13 is used as an example. It is assumed that the viewing operation on the first accessory slot is triggered by dragging to the top right. In this case, a selected top-right sector region is highlighted in the accessory switching region. The sector region is the first accessory slot.

It is to be noted that the interface shown in FIG. 13 is merely schematic, and a position of the first accessory slot in the accessory switching region in FIG. 13 is also schematic, which cannot be understood as a limitation on the present disclosure.

Third: the accessory switching region is represented as the rectangular region.

Figure 14:
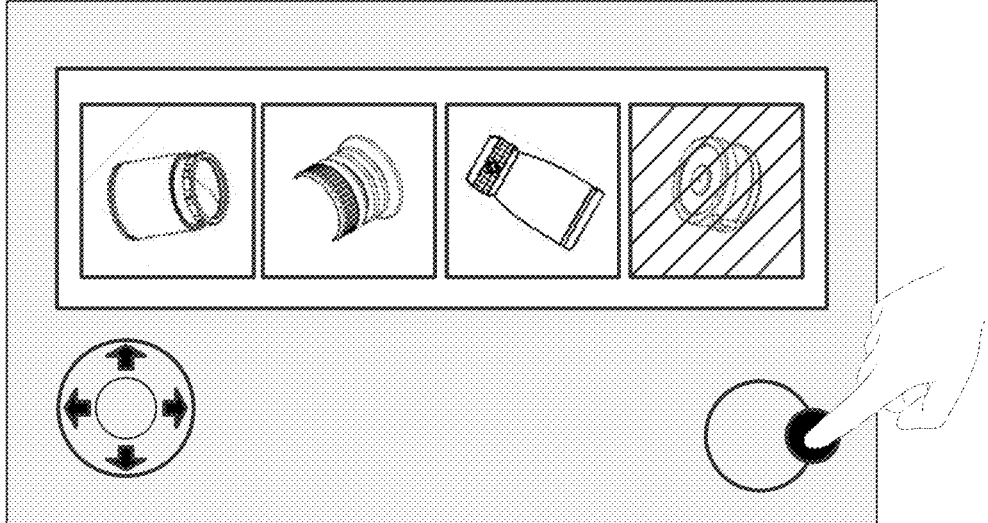
FIG. 14 is a schematic diagram of another interface on which a first accessory slot is highlighted according to an embodiment of the present disclosure.

For example, for ease of understanding, refer to FIG. 14. FIG. 14 is a schematic diagram of another interface on which the first accessory slot is highlighted according to an embodiment of the present disclosure. As shown in the figure, the player presses and drags the accessory switching control in a specific direction. In this case, a viewing operation on a specific accessory slot may be triggered. FIG. 14 is used as an example. It is assumed that the viewing operation on the first accessory slot is triggered by dragging to the right. In this case, a selected right matrix sub-region is highlighted in the accessory switching region. The matrix sub-region is the first accessory slot.

It is to be noted that the interface shown in FIG. 14 is merely schematic, and a position of the first accessory slot in the accessory switching region in FIG. 14 is also schematic, which cannot be understood as a limitation on the present disclosure.

It may be understood that highlighting includes but is not limited to highlighting, overstriking, blinking, color changing, marking, and the like. This is not limited herein.

This embodiment of the present disclosure provides the manner in which the first accessory slot is highlighted. In this manner, an accessory slot selected by the player is highlighted to prompt the player that a virtual accessory corresponding to the accessory slot has been selected. Therefore, a requirement for quick and accurate switching is met.

In some embodiments, based on each embodiment corresponding to FIG. 3, in another example embodiment provided in the embodiments of the present disclosure, the first shooting prop is fitted with K virtual accessories, the K virtual accessories include a second virtual accessory, and K is an integer greater than or equal to 1.

The method may further include that:

the terminal device highlights a second accessory slot in the accessory switching region when the first shooting prop currently uses the second virtual accessory, the second accessory slot being used for displaying the second virtual accessory.

In one or more embodiments, a manner in which the second accessory slot is highlighted is described. It can be seen from the foregoing embodiments that the accessory switching region may be represented as the ring region, the circular region, or the rectangular region, and the accessory switching region includes the at least three accessory slots. The following uses an example in which the accessory switching region includes four accessory slots and the first shooting prop is fitted with four virtual accessories for description.

First: the accessory switching region is represented as the ring region.

Figure 15:
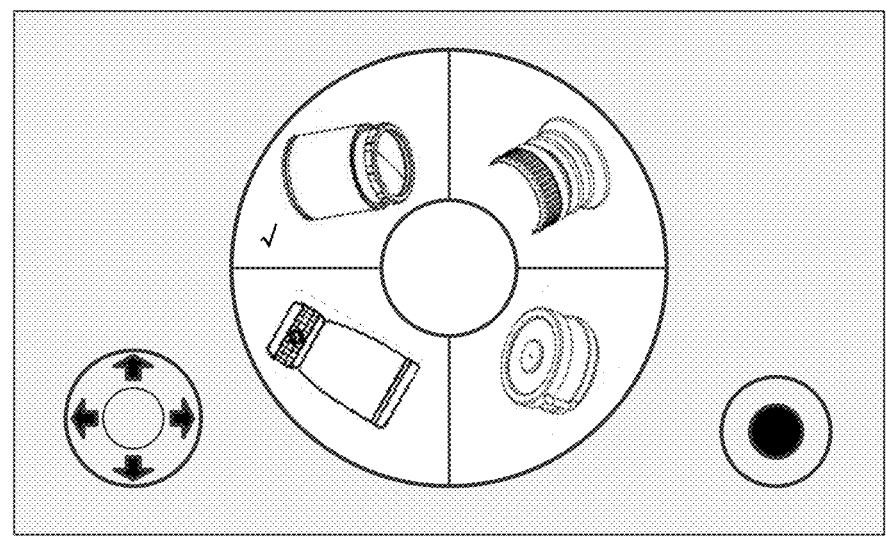
FIG. 15 is a schematic diagram of an interface on which a second accessory slot is highlighted according to an embodiment of the present disclosure.

For example, for ease of understanding, refer to FIG. 15. FIG. 15 is a schematic diagram of an interface on which the second accessory slot is displayed according to an embodiment of the present disclosure. As shown in the figure, it is assumed that the first shooting prop is currently fitted with the second virtual accessory, and the second virtual accessory is in a top-left sector ring region of the accessory switching region, that is, the second accessory slot. Based on this, the top-left sector ring region may be highlighted, for example, with a "check mark".

It is to be noted that the interface shown in FIG. 15 is merely schematic, and a position of the second accessory slot in the accessory switching region in FIG. 15 is also schematic, which cannot be understood as a limitation on the present disclosure.

Second: the accessory switching region is represented as the circular region.

Figure 16:
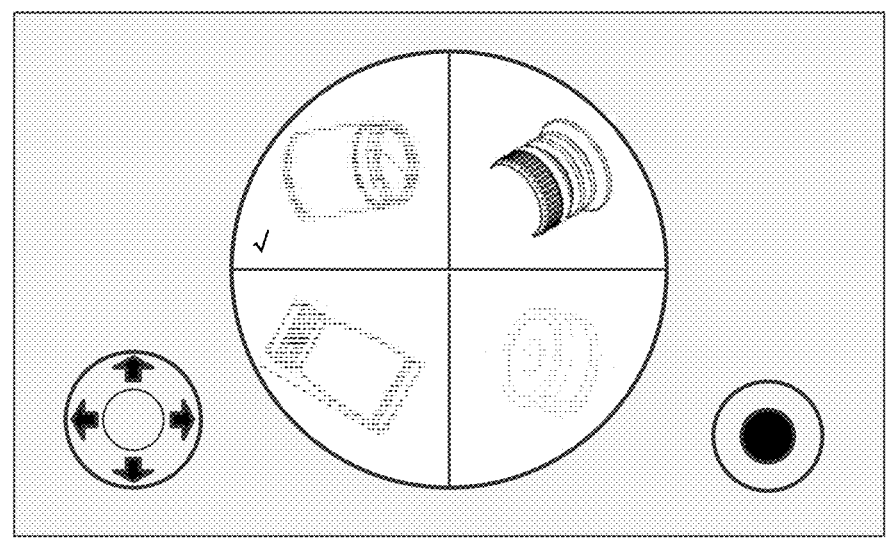
FIG. 16 is a schematic diagram of another interface on which a second accessory slot is highlighted according to an embodiment of the present disclosure.

For example, for ease of understanding, refer to FIG. 16. FIG. 16 is a schematic diagram of another interface on which the second accessory slot is displayed according to an embodiment of the present disclosure. As shown in the figure, it is assumed that the first shooting prop is currently fitted with the second virtual accessory, and the second virtual accessory is in a top-left sector region of the accessory switching region, that is, the second accessory slot. Based on this, the top-left sector region may be highlighted, for example, with a "check mark".

It is to be noted that the interface shown in FIG. 16 is merely schematic, and a position of the second accessory slot in the accessory switching region in FIG. 16 is also schematic, which cannot be understood as a limitation on the present disclosure.

Third: the accessory switching region is represented as the rectangular region.

Figure 17:
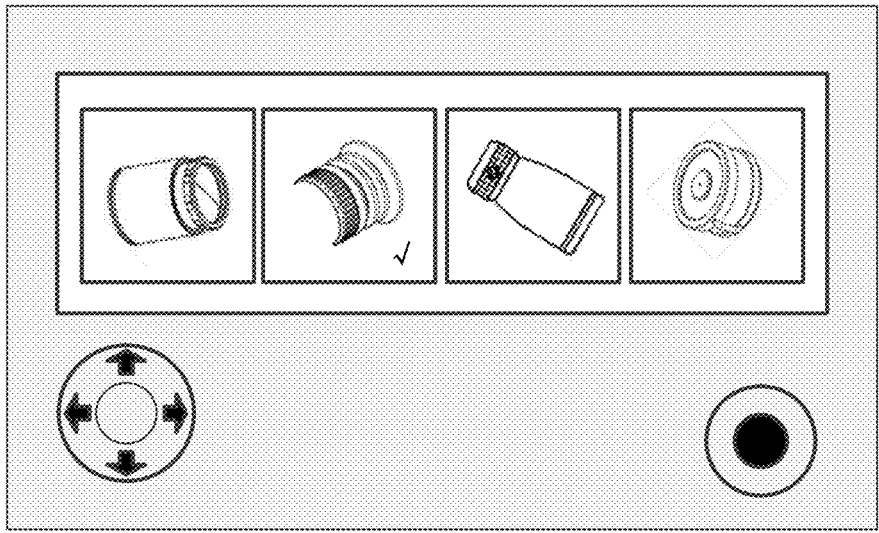
FIG. 17 is a schematic diagram of another interface on which a second accessory slot is highlighted according to an embodiment of the present disclosure.

For example, for ease of understanding, refer to FIG. 17. FIG. 17 is a schematic diagram of another interface on which the second accessory slot is displayed according to an embodiment of the present disclosure. As shown in the figure, it is assumed that the first shooting prop is currently fitted with the second virtual accessory, and the second virtual accessory is in a second matrix sub-region of the accessory switching region, that is, the second accessory slot. Based on this, the second matrix sub-region may be highlighted, for example, with a "check mark".

It is to be noted that the interface shown in FIG. 17 is merely schematic, and a position of the second accessory slot in the accessory switching region in FIG. 17 is also schematic, which cannot be understood as a limitation on the present disclosure.

It may be understood that highlighting includes but is not limited to highlighting, overstriking, blinking, color changing, marking, and the like. This is not limited herein.

This embodiment of the present disclosure provides the manner in which the second accessory slot is highlighted. In this manner, an accessory slot corresponding to a virtual accessory currently used by a shooting prop is highlighted to prompt the player that the virtual accessory corresponding to an accessory slot has been selected. Therefore, flexibility in operation is improved.

In some embodiments, based on each embodiment corresponding to FIG. 3, in another example embodiment provided in the embodiments of the present disclosure, the accessory switching region further includes a circular region, and the circular region is inside the ring region.

The method may further include that:

the terminal device displays, in the circular region in response to detecting a viewing operation on the first accessory slot, a position relationship between the first virtual accessory and the first shooting prop.

In one or more embodiments, a manner in which a position relationship between a virtual accessory and a shooting prop is displayed in an inner circle is described. It can be seen from the foregoing embodiments that the accessory switching region may include the ring region, the circular region is inside the ring region, and the position relationship between the first virtual accessory and the first shooting prop may be displayed in the circular region.

Figure 18:
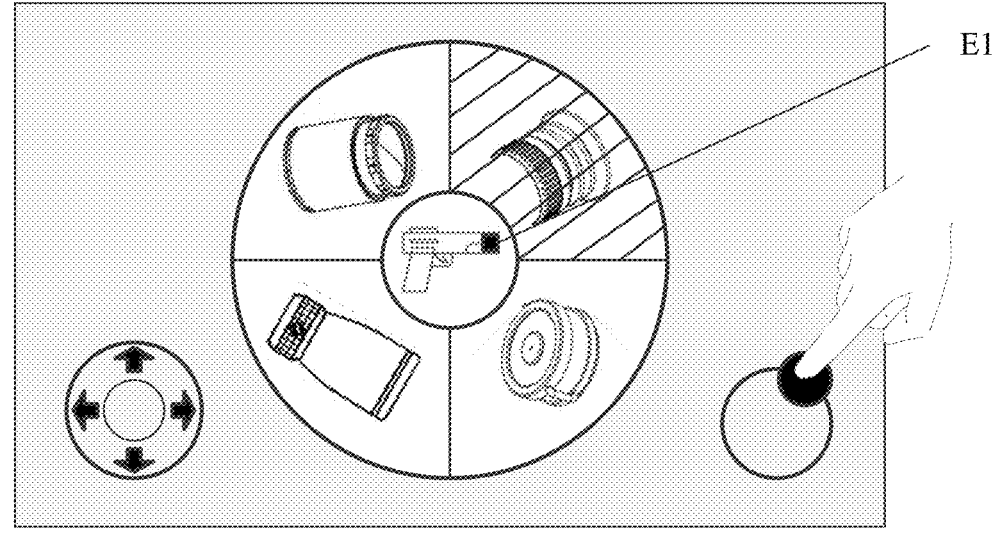
FIG. 18 is a schematic diagram of an interface on which a position relationship between a virtual accessory and a shooting prop is displayed according to an embodiment of the present disclosure.

Specifically, for ease of understanding, refer to FIG. 18. FIG. 18 is a schematic diagram of an interface on which the position relationship between a virtual accessory and a shooting prop is displayed according to an embodiment of the present disclosure. As shown in the figure, the player presses and drags the accessory switching control in a specific direction. In this case, a viewing operation on a specific accessory slot may be triggered. FIG. 18 is used as an example. It is assumed that the viewing operation on the first accessory slot is triggered by dragging to the top right. In this case, a selected top-right sector ring region is highlighted in the accessory switching region. The sector ring region is the first accessory slot.

Further, the position relationship between the first virtual accessory and the first shooting prop is displayed in the circular region inside the ring region. For example, the first virtual accessory is mounted to a position denoted as E1 on the first shooting prop. The position may be marked for the player to recognize.

It is to be noted that the interface shown in FIG. 18 is merely schematic, and a position of the first accessory slot in the accessory switching region in FIG. 18 is also schematic, which cannot be understood as a limitation on the present disclosure.

This embodiment of the present disclosure provides the manner in which the position relationship between a virtual accessory and a shooting prop is displayed in the inner circle. In this manner, the player may view a position at which a virtual accessory is mounted on a shooting prop, thereby recognizing the position of the virtual accessory on the shooting prop during a switching operation. This helps quick and accurate switching to another virtual accessory for use, improves recognition efficiency, and reduces a probability of mistaken switching.

In some embodiments, based on each embodiment corresponding to FIG. 3, in another example embodiment provided in the embodiments of the present disclosure, the accessory switching region further includes a circular region, and the circular region is inside the ring region.

The method may further include that:

the terminal device displays, in the circular region in response to detecting a viewing operation on the first accessory slot, accessory information corresponding to use of the first virtual accessory.

In one or more embodiments, a manner in which related information of the virtual accessory is displayed in an inner circle is described. It can be seen from the foregoing embodiments that the accessory switching region may include the ring region, the circular region is inside the ring region, and the accessory information corresponding to the first virtual accessory may be displayed in the circular region.

Figure 19:
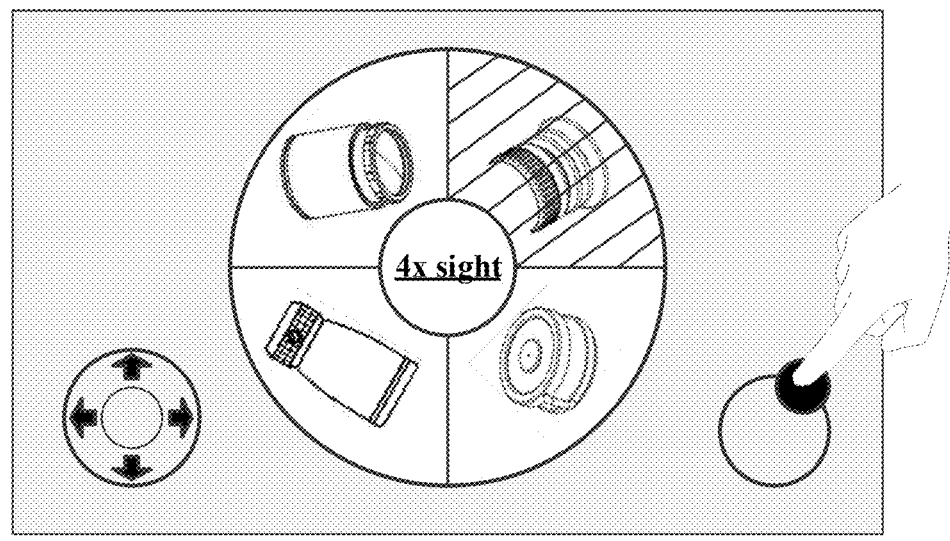
FIG. 19 is a schematic diagram of an interface on which accessory information of a virtual accessory is displayed according to an embodiment of the present disclosure.

Specifically, for ease of understanding, refer to FIG. 19. FIG. 19 is a schematic diagram of an interface on which accessory information of the virtual accessory is displayed according to an embodiment of the present disclosure. As shown in the figure, the player presses and drags the accessory switching control in a specific direction. In this case, a viewing operation on a specific accessory slot may be triggered. FIG. 19 is used as an example. It is assumed that the viewing operation on the first accessory slot is triggered by dragging to the top right. In this case, a selected top-right sector ring region is highlighted in the accessory switching region. The sector ring region is the first accessory slot.

Further, the accessory information corresponding to the first virtual accessory, for example, "4× sight", is displayed in the circular region inside the ring region, such that the player knows about the selected first virtual accessory.

It is to be noted that the interface shown in FIG. 19 is merely schematic, and a position of the first accessory slot in the accessory switching region in FIG. 19 is also schematic, which cannot be understood as a limitation on the present disclosure.

This embodiment of the present disclosure provides the manner in which the related information of the virtual accessory is displayed in the inner circle. In this manner, the player may view the related information of the virtual accessory, thereby recognizing a function of the virtual accessory during a switching operation. This helps quick and accurate switching the virtual accessory for use, improves recognition efficiency, and reduces a probability of mistaken switching.

In some embodiments, based on each embodiment corresponding to FIG. 3, in another example embodiment provided in the embodiments of the present disclosure, the accessory switching region further includes a circular region, and the circular region is inside the ring region. The method may further include that:

the terminal device displays, in the circular region in response to detecting a viewing operation on the first accessory slot, an aiming viewing angle after use of the first virtual accessory.

In one or more embodiments, a manner in which an aiming preview viewing angle of the virtual accessory is displayed in an inner circle is described. It can be seen from the foregoing embodiments that the accessory switching region may include the ring region, the circular region is inside the ring region, and the aiming viewing angle after the first shooting prop uses the first virtual accessory may be displayed in the circular region.

Figure 20:
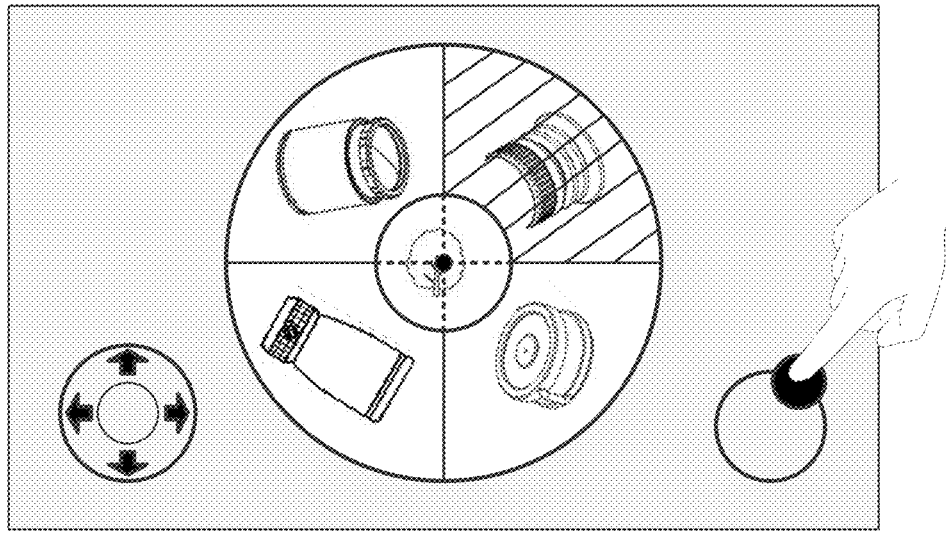
FIG. 20 is a schematic diagram of an interface on which an aiming viewing angle is displayed according to an embodiment of the present disclosure.

Specifically, for ease of understanding, refer to FIG. 20. FIG. 20 is a schematic diagram of an interface on which the aiming viewing angle is displayed according to an embodiment of the present disclosure. As shown in the figure, the player presses and drags the accessory switching control in a specific direction. In this case, a viewing operation on a specific accessory slot may be triggered. FIG. 20 is used as an example. It is assumed that the viewing operation on the first accessory slot is triggered by dragging to the top right. In this case, a selected top-right sector ring region is highlighted in the accessory switching region. The sector ring region is the first accessory slot.

Further, the aiming viewing angle after the first shooting prop uses the first virtual accessory is displayed in the circular region inside the ring region. For example, the first shooting prop can aim at a distant tree after using the first virtual accessory (for example, the "4× sight").

It is to be noted that the interface shown in FIG. 20 is merely schematic, and a position of the first accessory slot in the accessory switching region in FIG. 20 is also schematic, which cannot be understood as a limitation on the present disclosure.

This embodiment of the present disclosure provides the manner in which the aiming preview viewing angle of the virtual accessory is displayed in the inner circle. In this manner, the player may know about an aiming viewing angle after use of the virtual accessory, thereby previewing an aiming condition after use of a specific virtual accessory during a switching operation. This helps select a proper virtual accessory.

In some embodiments, based on each embodiment corresponding to FIG. 3, in another example embodiment provided in the embodiments of the present disclosure, the method may further include that:

the terminal device triggers the selection operation on the first accessory slot in response to detecting that the viewing operation on the first accessory slot is released.

In one or more embodiments, a manner of the selection operation on the first accessory slot is described. It can be seen from the foregoing embodiments that the player may press and drag the accessory switching control in a specific direction to trigger a viewing operation on a specific accessory slot (for example, the first accessory slot). Based on this, when the finger of the player is moved away, the viewing operation on the accessory slot (for example, the first accessory slot) is released, and a selection operation on the accessory slot (for example, the first accessory slot) is triggered.

Specifically, for ease of understanding, refer to FIG. 21. FIG. 21 is a schematic diagram of an interface on which virtual accessory switching is completed according to an embodiment of the present disclosure. As shown in (A) in FIG. 21, it is assumed that the second virtual accessory currently used by the first shooting prop is the "2× sight". The player touches and holds the accessory switching control to call up the accessory switching region shown in (B) in FIG. 21. The accessory switching region includes the ring region and the circular region. The player triggers a dragging operation in any direction through the accessory switching control. A sector ring region corresponding to the direction is highlighted. The finger of the player is moved away to implement switching to a corresponding virtual accessory. As shown in (C) in FIG. 21, the player triggers a dragging operation to the top right through the accessory switching control. After dragging to an unselected region, the finger is moved away to close the accessory switching region and complete virtual accessory switching. For example, after switching, the first virtual accessory used by the first shooting prop is the "red dot sight".

It is to be noted that the interface shown in FIG. 21 is merely schematic, whose layout may be adjusted in actual applications, and thus cannot be understood as a limitation on the present disclosure.

This embodiment of the present disclosure provides the manner of the selection operation on the first accessory slot. In this manner, when the player touches and holds the accessory switching control, the accessory switching region is unfolded in a center of a screen, the accessory switching control may be dragged while touched and held to any region to observe related information, and accurate switching may be completed when the finger is moved away. Based on this, quick switching between at least three virtual accessories is supported in the present disclosure. The related information displayed in a switching process can ensure a high operation speed of the player while reducing a probability of a misoperation.

In some embodiments, based on each embodiment corresponding to FIG. 3, in another example embodiment provided in the embodiments of the present disclosure, the first shooting prop is fitted with K virtual accessories, the K virtual accessories include a second virtual accessory, and K is an integer greater than or equal to 1.

The method may further include that:

the terminal device switches the second virtual accessory to the first virtual accessory when the first touch operation satisfies a second switching condition, and controls the first shooting prop to use the first virtual accessory.

In one or more embodiments, a manner in which virtual accessory switching is performed when the second switching condition is satisfied is described. It can be seen from the foregoing embodiments that if the first shooting prop is fitted with at least two (that is, a case in which K is greater than 1) available virtual accessories, the accessory switching control may be tapped to complete quick switching of the virtual accessories. The virtual accessories may be cyclically switched in a specific order.

Specifically, for ease of understanding, refer to FIG. 22. FIG. 22 is a schematic diagram of another interface on which virtual accessory switching is completed according to an embodiment of the present disclosure. As shown in (A) in FIG. 22, it is assumed that the second virtual accessory currently used by the first shooting prop is the "2× sight". The player may tap the accessory switching control to implement switching to another virtual accessory. As shown in (B) in FIG. 22, after switching, the first virtual accessory used by the first shooting prop is the "red dot sight".

It is to be noted that the interface shown in FIG. 22 is merely schematic, whose layout may be adjusted in actual applications, and thus cannot be understood as a limitation on the present disclosure.

This embodiment of the present disclosure provides the manner in which quick virtual accessory switching is performed when the second switching condition is satisfied. In this manner, the player may switch a virtual accessory currently used by a shooting prop to another virtual accessory, thereby achieving a purpose of switching the virtual accessory. Therefore, feasibility and operability of the solution are improved.

In some embodiments, based on each embodiment corresponding to FIG. 3, in another example embodiment provided in the embodiments of the present disclosure, after the operation that the terminal device obtains a first touch operation for the accessory switching control, the method may further include that:

the terminal device determines, in response to detecting that stay duration of a contact of the first touch operation on the accessory switching control is less than a duration threshold, that the first touch operation satisfies the second switching condition;

or the terminal device determines, in response to detecting that a trajectory of the first touch operation is successfully matched with a preset trajectory, that the first touch operation satisfies the second switching condition.

In one or more embodiments, various manners in which whether the first touch operation satisfies the second switching condition is determined are described. It can be seen from the foregoing embodiments that when the first touch operation satisfies the second switching condition, a virtual accessory may be switched quickly. A specific case in which the second switching condition is satisfied will be described below with reference to an example.

First: tap the accessory switching control.

For example, for ease of understanding, refer to FIG. 23. FIG. 23 is a schematic diagram of an interface on which the first touch operation satisfying the second switching condition is triggered according to an embodiment of the present disclosure. An example in which the duration threshold is 0.3 seconds is used, and it is assumed that the accessory switching control is round cake. As shown in (A) in FIG. 23, the finger is put on a screen of the terminal device. A contact of the finger is the contact of the first touch operation. At a starting moment (that is, a 0th second), the finger of the player is put on the accessory switching control, and timing is started. As shown in (B) in FIG. 23, the finger of the player is moved away from the accessory switching control at the (0.2)th second. Based on this, the terminal device determines that stay duration of the contact on the accessory switching control is less than the duration threshold, and thus determines that the first touch operation satisfies the second switching condition.

It is to be noted that the interface shown in FIG. 23 is merely schematic, whose layout may be adjusted in actual applications, and thus cannot be understood as a limitation on the present disclosure.

Second: drag the accessory switching control according to a trajectory.

For example, for ease of understanding, refer to FIG. 24. FIG. 24 is a schematic diagram of another interface on which the first touch operation satisfying the second switching condition is triggered according to an embodiment of the present disclosure. An example in which the preset trajectory is a clockwise semicircular trajectory is used, and it is assumed that the accessory switching control is round cake. As shown in (A) in FIG. 24, the finger is put on a screen of the terminal device. A contact of the finger is the contact of the first touch operation. As shown in (B) in FIG. 24, the finger presses and then clockwise drags the accessory switching control, and the first touch operation is completed after dragging to a position in (C) in FIG. 24. Based on this, the terminal device determines that the trajectory of the first touch operation is successfully matched with the preset trajectory, and thus determines that the first touch operation satisfies the second switching condition.

It is to be noted that the interface shown in FIG. 24 is merely schematic, whose layout may be adjusted in actual applications, and thus cannot be understood as a limitation on the present disclosure.

This embodiment of the present disclosure provides various manners in which whether the second switching condition is satisfied is determined. In this manner, the player may tap the accessory switching control to trigger the virtual accessories to be switched according to their positional order on the shooting prop. Alternatively, the player may slide a trajectory matched with the preset trajectory on the screen of the terminal device to trigger the first touch operation satisfying the second switching condition. Therefore, various feasible implementations are provided for the solution, improving diversity and flexibility of the solution.

In some embodiments, based on each embodiment corresponding to FIG. 3, in another example embodiment provided in the embodiments of the present disclosure, before the operation that the terminal device switches the second virtual accessory to the first virtual accessory and controls the first shooting prop to use the first virtual accessory, the method may further include that:

the terminal device displays, on a virtual accessory configuration interface, M shooting props and at least one selectable virtual accessory corresponding to each shooting prop, the M shooting props including the first shooting prop, and M being an integer greater than or equal to 1; and the terminal device determines a virtual accessory switching order corresponding to the first shooting prop in response to an accessory setting operation on the first shooting prop.

In one or more embodiments, a manner in which a switching priority of the virtual accessory is customized is described. It can be seen from the foregoing embodiments that when the virtual accessory is switched by tapping, the priority of the virtual accessory may be set according to a habit of the player. The player taps the accessory switching control to implement preferential switching to a virtual accessory with a highest priority. The player taps the accessory switching control again to implement switching to a virtual accessory with a second highest priority. By analogy, exhaustions are omitted herein. A manner in which the priority of the virtual accessory is configured is described below with reference to the drawings.

Figure 25:
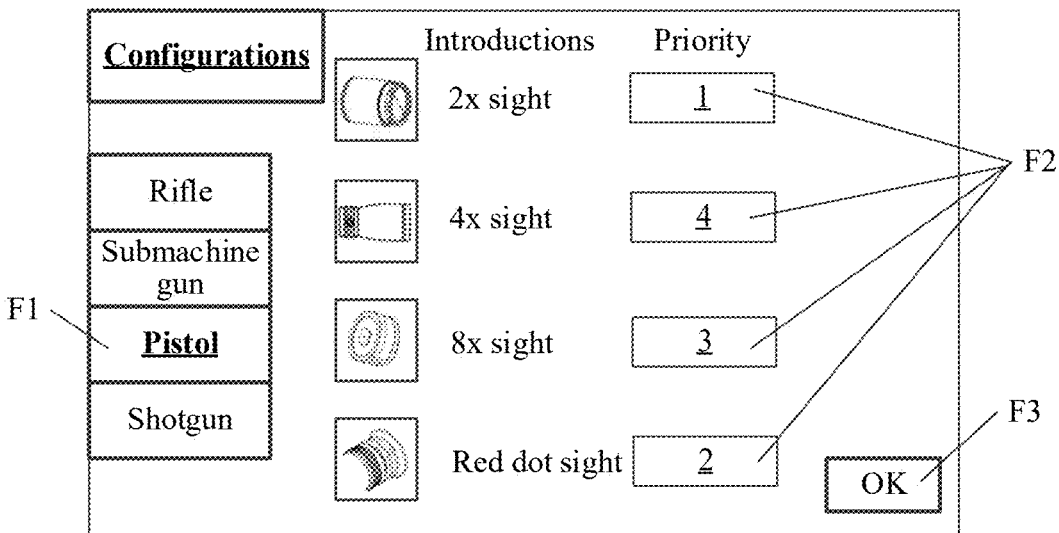
FIG. 25 is a schematic diagram of a virtual accessory configuration interface according to an embodiment of the present disclosure.

Specifically, refer to FIG. 25. FIG. 25 is a schematic diagram of a virtual accessory configuration interface according to an embodiment of the present disclosure. As shown in the figure, F1 is used for denoting the first shooting prop that is currently configured, F2 is used for denoting a priority setting region, and F3 is used for denoting an OK control. An example in which the first shooting prop is the "pistol" and M is 4 is used. Four shooting props (respectively the "rifle", the "shotgun", the "pistol", and the "submachine gun") and four selectable virtual accessories (respectively the "2× sight", the "4× sight", the "8× sight", and the "red dot sight") corresponding to each shooting prop are displayed on the virtual accessory configuration interface.

After the player taps a control corresponding to the first shooting prop, the virtual accessory configuration interface shown in FIG. 25 is displayed. The player may set a highest priority for the "2× sight", a second highest priority for the "red dot sight", a third highest priority for the "8× sight", and a lowest priority for the "4× sight". In this way, an accessory setting operation is completed. After completing setting, the player taps the OK control denoted as F3, and the terminal device may determine a virtual accessory switching order according to the accessory setting operation.

It is to be noted that the interface shown in FIG. 25 is merely schematic, whose layout may be adjusted in actual applications, and thus cannot be understood as a limitation on the present disclosure.

This embodiment of the present disclosure provides the manner in which the switching priority of the virtual accessory is customized. In this manner, considering that different players may have different accessory using habits, the player is allowed to customize the switching priority of the virtual accessory, thereby completing switching a target virtual accessory within short time. Therefore, feasibility and operability of the solution are improved.

In some embodiments, based on each embodiment corresponding to FIG. 3, in another example embodiment provided in the embodiments of the present disclosure, the method may further include that:

the terminal device displays a slot addition control and a slot deletion control on an accessory slot configuration interface; and the terminal device increases a quantity of accessory slots in the accessory switching region in response to detecting a touch instruction for the slot addition control; or the terminal device decreases the quantity of accessory slots in the accessory switching region in response to detecting a touch instruction for the slot deletion control.

In one or more embodiments, a manner in which the player customizes the quantity of accessory slots is described. It can be seen from the foregoing embodiments that the player may set a quantity of slots in the accessory switching region according to a habit. A manner in which the quantity of slots is configured is described below with reference to the drawings.

Figure 26:
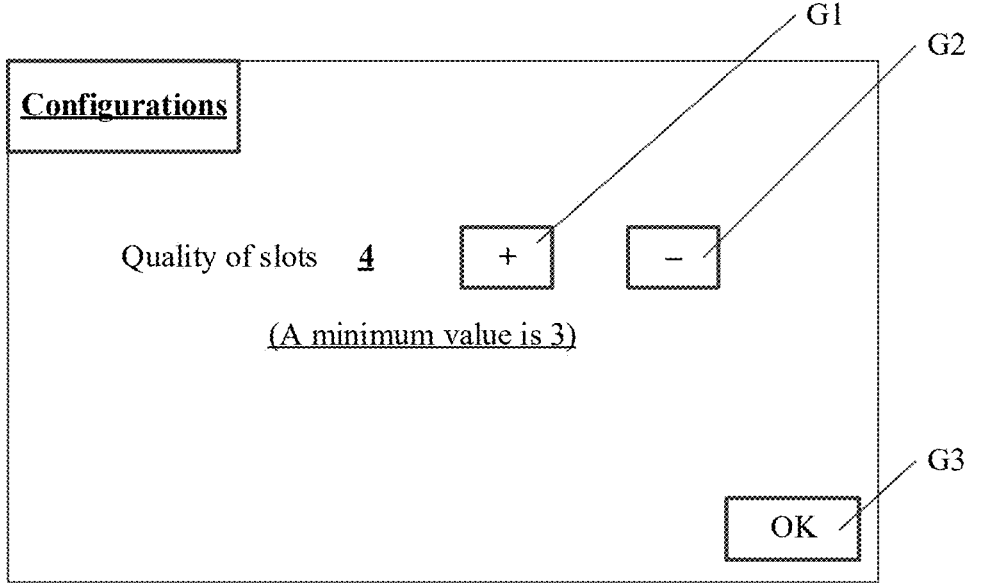
FIG. 26 is a schematic diagram of an accessory slot configuration interface according to an embodiment of the present disclosure.

Specifically, refer to FIG. 26. FIG. 26 is a schematic diagram of an accessory slot configuration interface according to an embodiment of the present disclosure. As shown in the figure, G1 is used for denoting a slot addition control, G2 is used for denoting a slot deletion control, and G3 is used for denoting an OK control. FIG. 26 is used as an example. For example, it is assumed that the quantity of slots defaults to 4. The player taps the slot addition control denoted as G1 to trigger the touch instruction for the slot addition control. In this case, the quantity of accessory slots is increased in the accessory switching region, and the quantity of slots is "5". For example, it is assumed that the quantity of slots defaults to 4. It is assumed that the player taps the slot deletion control denoted as G2 to trigger the touch instruction for the slot deletion control. In this case, the quantity of accessory slots is decreased in the accessory switching region, and the quantity of slots is "3". It may be understood that a minimum value of the quantity of slots may be set to "3".

It is to be noted that the interface shown in FIG. 26 is merely schematic, whose layout may be adjusted in actual applications, and thus cannot be understood as a limitation on the present disclosure.

This embodiment of the present disclosure provides the manner in which the player customizes the quantity of accessory slots. In this manner, considering that different players may have different accessory using habits, the player is allowed to customize the quantity of accessory slots. Therefore, flexibility and operability of the solution are improved.

In some embodiments, based on each embodiment corresponding to FIG. 3, in another example embodiment provided in the embodiments of the present disclosure, the method may further include that:

the terminal device displays an associated recommendation prompt on the target game interface, the associated recommendation prompt being determined according to a scene in which the virtual operation object is, and the associated recommendation prompt including a shooting prop recommendation prompt and a virtual accessory recommendation prompt.

In one or more embodiments, a manner in which a switching prompt is added for the player during the game is described. In the target game APP, the associated recommendation prompt may further be provided for the player according to a recognized game scene. It may be understood that in a case, the associated recommendation prompt is set in advance by a developer according to a scene in which the virtual operation object is probably, and in another case, the associated recommendation prompt is determined in real time according to a scene in which the virtual operation object is. This is not limited herein.

Specifically, for ease of understanding, refer to Table 1. Table 1 schematically shows a mapping relationship between a scene and an associated recommendation prompt.

TABLE 1

| Scene | Shooting prop | Virtual accessory |
| --- | --- | --- |
| Warehouse | Pistol | Red dot sight |
| Forest | Pistol | Red dot sight |
| Beach | Submachine gun | 4x sight |
| Ship | Submachine gun | 8x sight |
| Plain | Rifle | 2x sight |
| Mountain | Shotgun | 8x sight |

Figure 27:
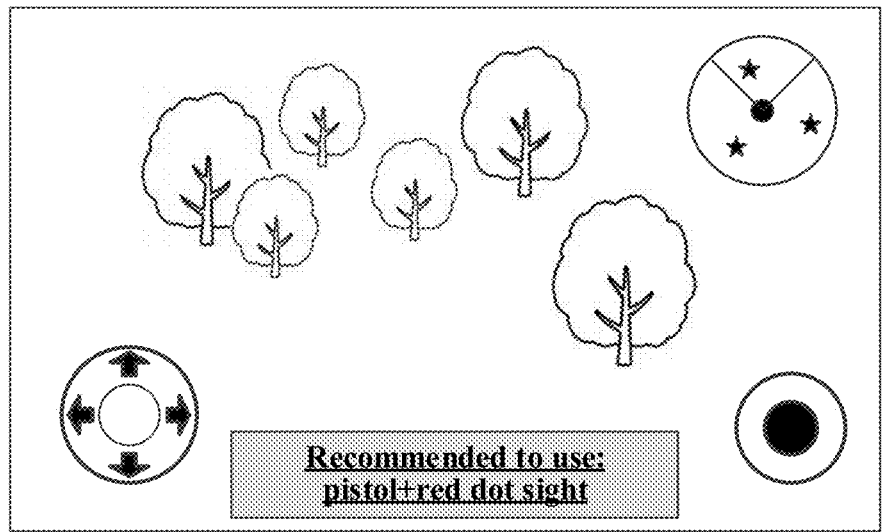
FIG. 27 is a schematic diagram of an interface on which an associated recommendation prompt is displayed according to an embodiment of the present disclosure.

Based on this, refer to FIG. 27. FIG. 27 is a schematic diagram of an interface on which the associated recommendation prompt is displayed according to an embodiment of the present disclosure. As shown in the figure, it is assumed that the virtual operation object enters the "forest" scene. With reference to Table 1, it can be seen that a to-be-recommended shooting prop is the "pistol", and a to-be-recommended virtual accessory is the "red dot sight". Therefore, the associated recommendation prompt is displayed on the target game interface.

It is to be noted that the interface shown in FIG. 27 is merely schematic, whose layout may be adjusted in actual applications, and thus cannot be understood as a limitation on the present disclosure.

This embodiment of the present disclosure provides the manner in which the switching prompt is added for the player during the game. In this manner, the shooting prop recommendation prompt and the virtual accessory recommendation prompt may be provided for the player during the game. This helps a novice player learn the game quickly, thereby obtaining good game experience.

In some embodiments, based on each embodiment corresponding to FIG. 3, in another example embodiment provided in the embodiments of the present disclosure, the method may further include that:

the terminal device displays a prop switching control on the target game interface;

the terminal device obtains a second touch operation on the prop switching control;

the terminal device displays a prop switching region when the second touch operation satisfies the first switching condition, the prop switching region including at least three prop slots, and the prop slot being used for displaying a shooting prop; and the terminal device controls, in response to detecting a selection operation on a first prop slot, the virtual operation object to use a second shooting prop, the first prop slot being any one of the at least three prop slots, and the first prop slot being used for displaying the second shooting prop.

In one or more embodiments, a manner in which different shooting props are switched is described. In the target game APP, the virtual operation object may further switch different shooting props. For example, the first shooting prop "pistol" is used in a scene, and the second shooting prop "machine gun" is used in another scene.

Specifically, for ease of description, refer to FIG. 28. FIG. 28 is a schematic diagram of an interface on which a shooting prop is switched according to an embodiment of the present disclosure. As shown in (A) in FIG. 28, H1 is used for denoting the prop switching control. The virtual operation object currently uses the first shooting prop (for example, the "pistol" prop). The player triggers the second touch operation. When the second touch operation satisfies the first switching condition, the prop switching region may be called up, that is, the prop switching region is displayed on the terminal device. The prop switching control includes the at least three prop slots. As shown in (B) in FIG. 28, the prop switching control includes four prop slots, and one shooting prop is displayed at each prop slot.

In order to present a switching degree of freedom in reality, switching between at least three shooting props may be supported. It is assumed that the prop switching region includes three prop slots (respectively a prop slot 1, a prop slot 2, and a prop slot 3), and the virtual operation object has three shooting props (respectively a shooting prop A, a shooting prop B, and a shooting prop C). Based on this, the shooting prop A is displayed at the prop slot 1, the shooting prop B is displayed at the prop slot 2, and the shooting prop C is displayed at the prop slot 3.

It is to be noted that if the virtual operation object has no shooting prop, each prop slot is empty. If there is only one shooting prop, the shooting prop is displayed at one prop slot, and each other prop slot is empty.

The player presses and drags the prop switching control in a specific direction to trigger a viewing operation on a specific prop slot. (B) in FIG. 28 is used as an example. It is assumed that the viewing operation on the first prop slot is triggered by dragging to the top right. In this case, a selected top-right sector ring region is highlighted in the prop switching region. The sector ring region is the first prop slot. In this case, the finger of the player is moved away to close the prop switching region and complete shooting prop switching. For example, after switching, the second shooting prop is the "machine gun".

It is to be noted that the interface shown in FIG. 28 is merely schematic, whose layout may be adjusted in actual applications, and thus cannot be understood as a limitation on the present disclosure.

This embodiment of the present disclosure provides the manner in which different shooting props are switched. In this manner, free switching between at least three shooting props may be implemented for the same virtual operation object. In addition, the player may view a shooting prop for switching at a prop slot. Improvement of shooting prop switching efficiency is facilitated, and a requirement for efficient and accurate shooting prop switching is met.

Figure 29:
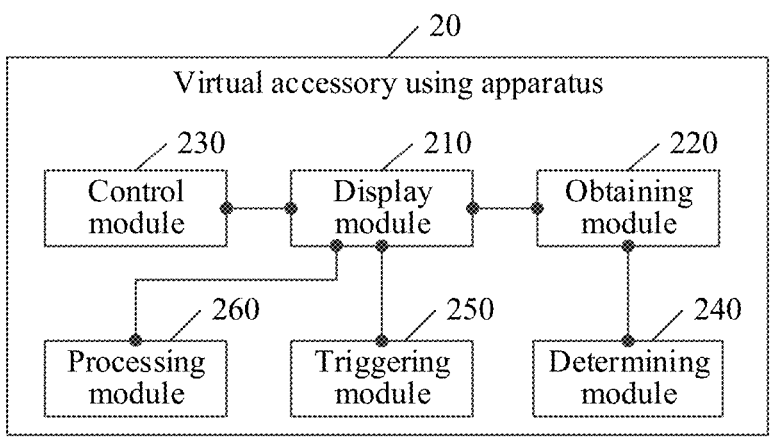
FIG. 29 is a schematic diagram of a virtual accessory using apparatus according to an embodiment of the present disclosure.

The following describes in detail a virtual accessory using apparatus in the present disclosure. Refer to FIG. 29. FIG. 29 is a schematic diagram of an embodiment of the virtual accessory using apparatus according to an embodiment of the present disclosure. The virtual accessory using apparatus 20 includes:

a display module 210, configured to display, on a target game interface, a first shooting prop and an accessory switching control for the first shooting prop, the first shooting prop being a shooting prop held by a virtual operation object;

an obtaining module 220, configured to obtain a first touch operation on the accessory switching control;

the display module 210 being further configured to display an accessory switching region when the first touch operation satisfies a first switching condition, the accessory switching region including at least three accessory slots, and the accessory slot being used for displaying a virtual accessory; and a control module 230, configured to control, in response to detecting a selection operation on a first accessory slot, the first shooting prop to use a first virtual accessory, the first accessory slot being any one of the at least three accessory slots, and the first accessory slot being used for displaying the first virtual accessory.

This embodiment of the present disclosure provides the virtual accessory using apparatus. According to the apparatus, free switching between at least three virtual accessories may be supported for a same shooting prop. In addition, a player may further view a virtual accessory for switching at an accessory slot. Improvement of virtual accessory switching efficiency is facilitated, and a requirement for efficient and accurate virtual accessory switching is met.

In some embodiments, based on the embodiment corresponding to FIG. 29, in another embodiment of the virtual accessory using apparatus 20 provided in this embodiment of the present disclosure, the virtual accessory using apparatus 20 further includes a determining module 240.

The determining module 240 is configured to: after the first touch operation on the accessory switching control is obtained, determine, in response to detecting that stay duration of a contact of the first touch operation on the accessory switching control is greater than or equal to a duration threshold, that the first touch operation satisfies the first switching condition.

Alternatively, the determining module 240 is further configured to: after the first touch operation on the accessory switching control is obtained, determine, in response to detecting in preset duration that a quantity of occurrences of a contact of the first touch operation on the accessory switching control is greater than or equal to a quantity threshold, that the first touch operation satisfies the first switching condition.

Alternatively, the determining module 240 is further configured to: after the first touch operation on the accessory switching control is obtained, determine, in response to detecting that a movement distance of a contact of the first touch operation on the accessory switching control is greater than or equal to a distance threshold, that the first touch operation satisfies the first switching condition.

This embodiment of the present disclosure provides a virtual accessory using apparatus. According to the apparatus, the player may trigger the first switching condition by pressing the accessory switching control for long time, or the player may trigger the first switching condition by double-clicking the accessory switching control, or the player may trigger the first switching condition by sliding the accessory switching control. Therefore, various feasible implementations are provided for the solution, improving diversity and flexibility of the solution.

In some embodiments, based on the embodiment corresponding to FIG. 29, in another embodiment of the virtual accessory using apparatus 20 provided in this embodiment of the present disclosure, the accessory switching region includes a ring region, the ring region is divided into at least three sector ring regions, and each sector ring region is an accessory slot.

Alternatively, the accessory switching region includes a circular region, the circular region is divided into at least three sector regions, and each sector region is an accessory slot.

Alternatively, the accessory switching region includes a rectangular region, the rectangular region is divided into at least three matrix sub-regions, and each matrix sub-region is an accessory slot.

This embodiment of the present disclosure provides a virtual accessory using apparatus. According to the apparatus, the sector ring region, the sector region, or the matrix sub-region may be used as an accessory slot, and the virtual accessory is displayed at the accessory slot. Therefore, a rational solution is provided for display of the virtual accessory, improving feasibility and flexibility of the solution.

In some embodiments, based on the embodiment corresponding to FIG. 29, in another embodiment of the virtual accessory using apparatus 20 provided in this embodiment of the present disclosure, the first shooting prop is fitted with K virtual accessories, and K is an integer greater than or equal to 1.

The display module 210 is further configured to highlight the first accessory slot in the accessory switching region in response to detecting a viewing operation on the first accessory slot.

This embodiment of the present disclosure provides a virtual accessory using apparatus. According to the apparatus, an accessory slot selected by the player is highlighted to prompt the player that a virtual accessory corresponding to the accessory slot has been selected. Therefore, a requirement for quick and accurate switching is met.

In some embodiments, based on the embodiment corresponding to FIG. 29, in another embodiment of the virtual accessory using apparatus 20 provided in this embodiment of the present disclosure, the first shooting prop is fitted with K virtual accessories, the K virtual accessories include a second virtual accessory, and K is an integer greater than or equal to 1.

The display module 210 is further configured to highlight a second accessory slot in the accessory switching region when the first shooting prop currently uses the second virtual accessory. The second accessory slot is used for displaying the second virtual accessory.

This embodiment of the present disclosure provides a virtual accessory using apparatus. According to the apparatus, an accessory slot corresponding to a virtual accessory currently used by a shooting prop is highlighted to prompt the player that the virtual accessory corresponding to an accessory slot has been selected. Therefore, flexibility in operation is improved.

In some embodiments, based on the embodiment corresponding to FIG. 29, in another embodiment of the virtual accessory using apparatus 20 provided in this embodiment of the present disclosure, when the accessory switching region includes the ring region, the accessory switching region further includes a circular region, and the circular region is inside the ring region.

The display module 210 is further configured to: in response to detecting a viewing operation on the first accessory slot, display, in the circular region, a position relationship between the first virtual accessory and the first shooting prop, or display, in the circular region, accessory information corresponding to use of the first virtual accessory, or display, in the circular region, an aiming viewing angle after use of the first virtual accessory.

This embodiment of the present disclosure provides a virtual accessory using apparatus. According to the apparatus, the player may view in real time a position at which a virtual accessory is mounted on a shooting prop, thereby recognizing the position of the virtual accessory on the shooting prop during a switching operation. Alternatively, the player may view in real time the related information of the virtual accessory, thereby recognizing a function of the virtual accessory during a switching operation. Alternatively, the player may view in real time an aiming viewing angle after use of the virtual accessory, thereby previewing an aiming condition after use of a specific virtual accessory during a switching operation. This helps quick and accurate switching to the corresponding virtual accessory, improves recognition efficiency, and reduces a probability of mistaken switching.

In some embodiments, based on the embodiment corresponding to FIG. 29, in another embodiment of the virtual accessory using apparatus 20 provided in this embodiment of the present disclosure, the virtual accessory using apparatus 20 further includes a triggering module 250.

The triggering module 250 is configured to trigger the selection operation on the first accessory slot in response to detecting that the viewing operation on the first accessory slot is released.

This embodiment of the present disclosure provides a virtual accessory using apparatus. According to the apparatus, when the player touches and holds the accessory switching control, the accessory switching region is unfolded in a center of a screen, the accessory switching control may be dragged while touched and held to any region to observe related information, and accurate switching may be completed when the finger is moved away. Based on this, quick switching between at least three virtual accessories is supported in the present disclosure. The related information displayed in a switching process can ensure a high operation speed of the player while reducing a probability of a misoperation.

In some embodiments, based on the embodiment corresponding to FIG. 29, in another embodiment of the virtual accessory using apparatus 20 provided in this embodiment of the present disclosure, the first shooting prop is fitted with K virtual accessories, the K virtual accessories include a second virtual accessory, K is an integer greater than or equal to 1, and the first virtual accessory is a virtual accessory currently used by the first shooting prop.

The control module 230 is further configured to switch the second virtual accessory to the first virtual accessory when the first touch operation satisfies a second switching condition, and control the first shooting prop to use the first virtual accessory.

This embodiment of the present disclosure provides a virtual accessory using apparatus. According to the apparatus, the player may switch a virtual accessory currently used by a shooting prop to a selected virtual accessory, thereby achieving a purpose of switching the virtual accessory. Therefore, feasibility and operability of the solution are improved.

In some embodiments, based on the embodiment corresponding to FIG. 29, in another embodiment of the virtual accessory using apparatus 20 provided in this embodiment of the present disclosure, the determining module 240 is further configured to: after the first touch operation on the accessory switching control is obtained, determine, in response to detecting that stay duration of a contact of the first touch operation on the accessory switching control is less than a duration threshold, that the first touch operation satisfies the second switching condition.

Alternatively, the determining module 240 is further configured to: after the first touch operation on the accessory switching control is obtained, determine, in response to detecting that a trajectory of the first touch operation is successfully matched with a preset trajectory, that the first touch operation satisfies the first switching condition.

This embodiment of the present disclosure provides a virtual accessory using apparatus. According to the apparatus, the player may tap the accessory switching control, and the virtual accessories may be switched according to their positional order on the shooting prop, that is, the second switching condition is triggered. Alternatively, the player slides a trajectory matched with the preset trajectory on the screen of the terminal device to trigger the second switching condition. Therefore, various feasible implementations are provided for the solution, improving diversity and flexibility of the solution.

In some embodiments, based on the embodiment corresponding to FIG. 29, in another embodiment of the virtual accessory using apparatus 20 provided in this embodiment of the present disclosure, the display module 210 is further configured to: before the second virtual accessory is switched to the first virtual accessory and the first shooting prop is controlled to use the first virtual accessory, display, on a virtual accessory configuration interface, M shooting props and at least one selectable virtual accessory corresponding to each shooting prop. The M shooting props include the first shooting prop. M is an integer greater than or equal to 1.

The determining module 240 is further configured to determine a virtual accessory switching order corresponding to the first shooting prop in response to an accessory setting operation on the first shooting prop.

This embodiment of the present disclosure provides a virtual accessory using apparatus. According to the apparatus, considering that different players may have different accessory using habits, the player is allowed to customize the switching priority of the virtual accessory, thereby completing switching a target virtual accessory within short time. Therefore, feasibility and operability of the solution are improved.

In some embodiments, based on the embodiment corresponding to FIG. 29, in another embodiment of the virtual accessory using apparatus 20 provided in this embodiment of the present disclosure, the virtual accessory using apparatus 20 further includes a processing module 260.

The display module 210 is further configured to display a slot addition control and a slot deletion control on an accessory slot configuration interface.

The processing module 260 is configured to increase a quantity of accessory slots in the accessory switching region in response to detecting a touch instruction for the slot addition control.

The processing module 260 is further configured to decrease a quantity of accessory slots in the accessory switching region in response to detecting a touch instruction for the slot deletion control.

This embodiment of the present disclosure provides a virtual accessory using apparatus. According to the apparatus, considering that different players may have different accessory using habits, the player is allowed to customize the quantity of accessory slots. Therefore, flexibility and operability of the solution are improved.

In some embodiments, based on the embodiment corresponding to FIG. 29, in another embodiment of the virtual accessory using apparatus 20 provided in this embodiment of the present disclosure, the display module 210 is further configured to display an associated recommendation prompt on the target game interface. The associated recommendation prompt is determined according to a scene in which the virtual operation object is. The associated recommendation prompt includes a shooting prop recommendation prompt and a virtual accessory recommendation prompt.

This embodiment of the present disclosure provides a virtual accessory using apparatus. According to the apparatus, the shooting prop recommendation prompt and the virtual accessory recommendation prompt may be provided for the player during the game, thereby improving diversity and flexibility of a playing method. In addition, this helps a novice player learn the game quickly, thereby obtaining good game experience.

In some embodiments, based on the embodiment corresponding to FIG. 29, in another embodiment of the virtual accessory using apparatus 20 provided in this embodiment of the present disclosure, the display module 210 is further configured to display a prop switching control on the target game interface.

The obtaining module 220 is further configured to obtain a second touch operation on the prop switching control.

The display module 210 is further configured to display a prop switching region when the second touch operation satisfies the first switching condition. The prop switching region includes at least three prop slots. The prop slot is used for displaying a shooting prop.

The control module 230 is further configured to control, in response to detecting a selection operation on a first prop slot, the virtual operation object to use a second shooting prop. The first prop slot is any one of the at least three prop slots. The first prop slot is used for displaying the second shooting prop.

This embodiment of the present disclosure provides a virtual accessory using apparatus. According to the apparatus, free switching between at least three shooting props may be implemented for the same virtual operation object. In addition, the player may view a shooting prop for switching at a prop slot. Improvement of shooting prop switching efficiency is facilitated, and a requirement for efficient and accurate shooting prop switching may be met.

Figure 30:
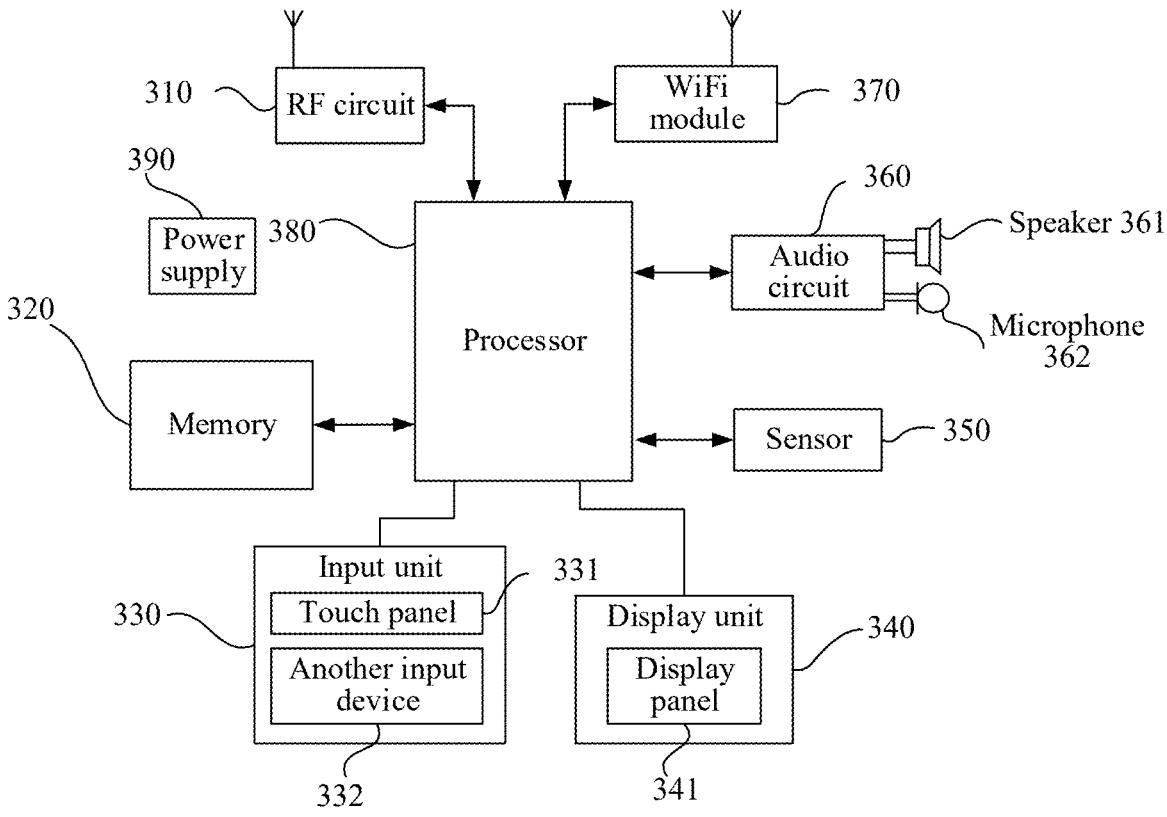
FIG. 30 is a schematic diagram of a structure of a terminal device according to an embodiment of the present disclosure.

An embodiment of the present disclosure also provides another virtual accessory using apparatus. The virtual accessory using apparatus may be deployed in a terminal device. As shown in FIG. 30, for ease of description, only parts related to this embodiment of the present disclosure are shown, and specific technical details which are undisclosed refer to the method of the embodiments of the present disclosure. The terminal device may be any terminal device including a mobile phone, a tablet computer, a personal digital assistant (PDA), a point of sales (POS), an in-vehicle computer, or the like. An example in which the terminal device is a mobile phone is used.

FIG. 30 is a block diagram of a partial structure of a mobile phone related to the terminal according to this embodiment of the present disclosure. Referring to FIG. 30, the mobile phone includes components such as a radio frequency (RF) circuit 310, a memory 320, an input unit 330, a display unit 340, a sensor 350, an audio circuit 360, a wireless fidelity (WiFi) module 370, a processor 380, and a power supply 390. The input unit 330 may include a touch panel 331 and another input device 332. The display unit 340 may include a display panel 341. The audio circuit 360 may be connected to a speaker 361 and a microphone 362. It may be understood by a person skilled in the art that the structure of the mobile phone shown in FIG. 30 does not form a limitation on the mobile phone. More or fewer components than those shown in the figure may be included, or some components are combined, or different component arrangements are used.

As a control center of the mobile phone, the processor 380 connects each part of the entire mobile phone by use of various interfaces and lines, and executes various functions and data processing of the mobile phone by running or executing a software program and/or a module stored in the memory 320 and calling data stored in the memory 320, thereby monitoring the entire mobile phone. In some embodiments, the processor 380 may include one or more processing units. In some embodiments, the processor 380 may integrate an APP processor and a modulation and demodulation processor. The APP processor mainly processes an operating system, a user interface, an APP, and the like. The modulation and demodulation processor mainly processes wireless communication. It may be understood that the modulation and demodulation processor may not be integrated into the processor 380.

In this embodiment of the present disclosure, the processor 380 of the terminal device is further configured to perform the virtual accessory using method provided in each embodiment of the present disclosure.

It may be understood that the steps performed by the terminal device in the foregoing embodiments may be based on the structure of the terminal device shown in FIG. 30.

An embodiment of the present disclosure also provides a computer-readable storage medium. The computer-readable storage medium stores a computer program which, when run in a computer, enables the computer to perform the method as described in each of the foregoing embodiments.

An embodiment of the present disclosure also provides a computer program product including a program, which, when run in a computer, enables the computer to perform the method as described in each of the foregoing embodiments.

A person skilled in the art may clearly learn about that for ease and brevity of description, specific working processes of the above-described system, apparatus, and unit may refer to the corresponding processes in the method embodiment, and will not be elaborated herein.

In some embodiments provided in the present disclosure, it is to be understood that the disclosed system, apparatus, and method may be implemented in another manner. For example, the apparatus embodiment described above is merely schematic. For example, division of the units is merely a logic function division, and other division manners may be used in actual implementations. For example, a plurality of units or components may be combined or integrated into another system, or some characteristics may be neglected or not executed. In addition, coupling or direct coupling or communication connection between the displayed or discussed components may be indirect coupling or communication connection, implemented through some interfaces, of the apparatus or the unit, and may be electrical and mechanical or use other forms.

The units described as separate parts may or may not be physically separated. Parts displayed as units may or may not be physical units, that is, may be located in the same place or distributed to a plurality of network units. Some or all of the units may be selected as actually needed to achieve an objective of the solution of this embodiment.

In addition, each function unit in each embodiment of the present disclosure may be integrated into a processing unit. Alternatively, each unit may physically exist independently. Alternatively, two or more than two units may be integrated into a unit. The integrated unit may be implemented in a hardware form or in a form of a software function unit.

When implemented in the form of the software function unit and sold or used as an independent product, the integrated unit may be stored in a computer-readable storage medium. Based on such an understanding, the technical solutions of the present disclosure substantially or parts making contributions to the related art or all or part of the technical solutions may be embodied in a form of a software product. The computer software product is stored in a storage medium, including a plurality of instructions for enabling a computer device (which may be a personal computer, a server, a network device, or the like) to perform all or some of the steps of the method in each embodiment of the present disclosure. The storage medium includes various media capable of storing program code, for example, a USB flash drive, a mobile hard disk, a read-only memory (ROM), a random access memory (RAM), a magnetic disk, or an optical disk.

The above embodiment is used not to limit but only to describe the technical solutions of the present disclosure. Although the present disclosure is described in detail with reference to the foregoing embodiments, it is to be understood by a person of ordinary skill in the art that modifications may still be made to the technical solutions described in the foregoing embodiments, or equivalent replacements may be made to some technical features, and essences of corresponding technical solutions obtained by these modifications or replacements are kept within a spirit and a scope of the technical solution of each embodiment of the present disclosure.

What is claimed is:

1. A virtual accessory using method, performed by a terminal device and comprising:

displaying, on a target game interface, a first shooting prop and an accessory switching control for the first shooting prop, the first shooting prop being a shooting prop held by a virtual operation object;

obtaining a first touch operation on the accessory switching control;

displaying an accessory switching region when the first touch operation satisfies a first switching condition, the accessory switching region comprising a surrounding region and a view sub-region located inside the surrounding region, the surrounding region including at least three slot sub-regions, and each slot sub-region being an accessory slot configured to display a virtual accessory;

displaying in the view sub-region, in response to detecting a viewing operation on a first accessory slot, a position relationship between the first virtual accessory and the first shooting prop; and controlling, in response to detecting a selection operation on a first accessory slot, the first shooting prop to use a first virtual accessory, the first accessory slot being one of the at least three accessory slots, and the first accessory slot being configured to display the first virtual accessory.

2. The method according to claim 1, wherein the first switching condition comprises one of:

stay duration of a contact of the first touch operation on the accessory switching control is greater than or equal to a duration threshold;

a quantity of occurrences of a contact of the first touch operation on the accessory switching control in a preset duration is greater than or equal to a quantity threshold; and a movement distance of a contact of the first touch operation on the accessory switching control is greater than or equal to a distance threshold.

3. The method according to claim 1, wherein the surrounding region comprises: a ring region divided into at least three sector ring regions, a circular region divided into at least three sector regions, or a rectangular region divided into at least three matrix sub-regions.

4. The method according to claim 1, wherein the first shooting prop is fitted with K virtual accessories, and K is an integer greater than or equal to 1; and the method further comprises:

highlighting the first accessory slot in the accessory switching region in response to detecting the viewing operation on the first accessory slot.

5. The method according to claim 1, wherein the first shooting prop is fitted with K virtual accessories, the K virtual accessories comprise a second virtual accessory, and K is an integer greater than 1; and the method further comprises:

highlighting a second accessory slot in the accessory switching region when the first shooting prop currently uses the second virtual accessory, the second accessory slot being configured to display the second virtual accessory.

6. The method according to claim 1, wherein the surrounding region is a ring region which includes the at least three slot sub-regions, and the view sub-region is a circular region.

7. The method according to claim 1, wherein the method further comprises:

triggering the selection operation on the first accessory slot in response to detecting that the viewing operation on the first accessory slot is released.

8. The method according to claim 1, wherein the first shooting prop is fitted with K virtual accessories, the K virtual accessories comprise a second virtual accessory, K is an integer greater than 1, and the second virtual accessory is a virtual accessory currently used by the first shooting prop; and the method further comprises:

switching the second virtual accessory to the first virtual accessory when the first touch operation satisfies a second switching condition, and controlling the first shooting prop to use the first virtual accessory.

9. The method according to claim 8, wherein the second switching condition comprises one of:

stay duration of a contact of the first touch operation on the accessory switching control is less than a duration threshold; and a trajectory of the first touch operation is successfully matched with a preset trajectory.

10. The method according to claim 8, wherein the method further comprises:

displaying, on a virtual accessory configuration interface, M shooting props and at least one selectable virtual accessory corresponding to each shooting prop, the M shooting props comprising the first shooting prop, and M being an integer greater than or equal to 1; and determining a virtual accessory switching order corresponding to the first shooting prop in response to an accessory setting operation on the first shooting prop.

11. The method according to claim 1, wherein the method further comprises:

displaying a slot addition control and a slot deletion control on an accessory slot configuration interface; and increasing a quantity of accessory slots in the accessory switching region in response to detecting a touch instruction for the slot addition control; or decreasing the quantity of accessory slots in the accessory switching region in response to detecting a touch instruction for the slot deletion control.

12. The method according to claim 1, wherein the method further comprises:

displaying an associated recommendation prompt on the target game interface, the associated recommendation prompt being determined according to a scene in which the virtual operation object is, and the associated recommendation prompt comprising a shooting prop recommendation prompt and a virtual accessory recommendation prompt.

13. The method according to claim 1, wherein the method further comprises:

displaying a prop switching control on the target game interface;

obtaining a second touch operation on the prop switching control;

displaying a prop switching region when the second touch operation satisfies the first switching condition, the prop switching region comprising at least three prop slots, and the prop slot being configured to display a shooting prop; and controlling, in response to detecting a selection operation on a first prop slot, the virtual operation object to use a second shooting prop, the first prop slot being one of the at least three prop slots, and the first prop slot being configured to display the second shooting prop.

14. The method according to claim 1, wherein:

the view sub-region further displays an aiming viewing angle after use of the first virtual accessory in response to detecting the viewing operation on the first accessory slot.

15. The method according to claim 1, wherein:

the view operation on the first accessory slot includes pressing and dragging the accessory switching control in a direction corresponding to the first accessory slot.

16. A virtual accessory using apparatus, comprising:

a memory and a processor, the memory being configured to store a program, the processor being configured to execute the program in the memory and perform:

displaying, on a target game interface, a first shooting prop and an accessory switching control for the first shooting prop, the first shooting prop being a shooting prop held by a virtual operation object;

obtaining a first touch operation on the accessory switching control;

displaying an accessory switching region when the first touch operation satisfies a first switching condition, the accessory switching region comprising a surrounding region and a view sub-region located inside the surrounding region, the surrounding region including at least three slot sub-regions, and each slot sub-region being an accessory slot configured to display a virtual accessory;

displaying in the view sub-region, in response to detecting a viewing operation on a first accessory slot, a position relationship between the first virtual accessory and the first shooting prop; and controlling, in response to detecting a selection operation on a first accessory slot, the first shooting prop to use a first virtual accessory, the first accessory slot being one of the at least three accessory slots, and the first accessory slot being configured to display the first virtual accessory.

17. The apparatus according to claim 16, wherein the first switching condition comprises one of:

stay duration of a contact of the first touch operation on the accessory switching control is greater than or equal to a duration threshold;

a quantity of occurrences of a contact of the first touch operation on the accessory switching control in a preset duration is greater than or equal to a quantity threshold; and a movement distance of a contact of the first touch operation on the accessory switching control is greater than or equal to a distance threshold.

18. The apparatus according to claim 16, wherein the surrounding region is a ring region which includes the at least three slot sub-regions, and the view sub-region is a circular region.

19. The apparatus according to claim 16, wherein the first shooting prop is fitted with K virtual accessories, and K is an integer greater than or equal to 1; and the processor is further configured to perform:

highlighting the first accessory slot in the accessory switching region in response to detecting the viewing operation on the first accessory slot.

20. A non-transitory computer-readable storage medium storing a computer program, the computer program, when run in a computer, causing the computer to perform:

displaying, on a target game interface, a first shooting prop and an accessory switching control for the first shooting prop, the first shooting prop being a shooting prop held by a virtual operation object;

obtaining a first touch operation on the accessory switching control;

displaying an accessory switching region when the first touch operation satisfies a first switching condition, the accessory switching region comprising a surrounding region and a view sub-region located inside the surrounding region, the surrounding region including at least three slot sub-regions, and each slot sub-region being an accessory slot configured to display a virtual accessory;

displaying in the view sub-region, in response to detecting a viewing operation on a first accessory slot, a position relationship between the first virtual accessory and the first shooting prop; and controlling, in response to detecting a selection operation on a first accessory slot, the first shooting prop to use a first virtual accessory, the first accessory slot being one of the at least three accessory slots, and the first accessory slot being configured to display the first virtual accessory.

* * * * *